United States Patent
Fitzsimmons

(10) Patent No.: US 11,285,924 B1
(45) Date of Patent: Mar. 29, 2022

(54) REVERSE ROTATION SIDE WASHER FOR VEHICLES INCLUDING A SHAFT ASSEMBLY AND RETROFIT DISCS

(71) Applicant: IWASH TECHNOLOGY LLC, Milwaukie, OR (US)

(72) Inventor: Jeff R. Fitzsimmons, Mulino, OR (US)

(73) Assignee: iWash Technology LLC, Milwaukie, OR (US)

(*) Notice: Subject to any disclaimer, the term of this patent is extended or adjusted under 35 U.S.C. 154(b) by 41 days.

(21) Appl. No.: 16/733,678

(22) Filed: Jan. 3, 2020

Related U.S. Application Data

(62) Division of application No. 15/422,377, filed on Feb. 1, 2017, now Pat. No. 10,549,728.

(60) Provisional application No. 62/291,252, filed on Feb. 4, 2016.

(51) Int. Cl.
  *B60S 3/06* (2006.01)
  *B23D 45/00* (2006.01)

(52) U.S. Cl.
  CPC ............ *B60S 3/063* (2013.01); *B23D 45/003* (2013.01)

(58) Field of Classification Search
  CPC ............ B60S 3/06; B23D 45/00; B23D 45/02
  See application file for complete search history.

(56) References Cited

U.S. PATENT DOCUMENTS

| | | | | |
|---|---|---|---|---|
| 2,932,983 | A * | 4/1960 | Unterborn | F16H 53/025 74/567 |
| 5,185,898 | A * | 2/1993 | Johnson | E01H 1/003 15/179 |
| D378,004 | S * | 2/1997 | Wilson | D32/25 |
| 5,799,558 | A * | 9/1998 | Hewitt | B27B 5/34 30/388 |
| 5,813,728 | A * | 9/1998 | Zigerlig | A46B 3/04 300/21 |
| 5,870,827 | A * | 2/1999 | Holst | B27B 9/02 30/122 |
| 6,158,320 | A * | 12/2000 | Vallance | B27B 5/34 83/665 |
| D437,762 | S | 2/2001 | Suzuki | |
| 6,886,312 | B1 * | 5/2005 | Inman | A01F 25/183 100/144 |
| D579,297 | S | 10/2008 | Jeiziner et al. | |

(Continued)

*Primary Examiner* — Michael D Jennings
(74) *Attorney, Agent, or Firm* — Renaissance IP Law Group, LLP; David A. Crowther

(57) ABSTRACT

Embodiments include a vehicle side washer assembly, a shaft assembly, and horizontal cloth brush panels. The side washer assembly includes a retractable angled primary arm, a retractable secondary arm, a shaft assembly having an upright shaft, and horizontal cloth brush panels. The upright shaft is disposed through a shaft attachment region of each of the horizontal cloth brush panels. The shaft assembly includes an upright shaft including notches and protrusions, and retrofit discs each including a shaft opening that matches contours of the upright shaft. Each of the retrofit discs includes rotary notches. The horizontal cloth brush panels each include flat fingers, a contiguous central region, and a brush shaft opening cut to match contours of the upright shaft. The horizontal cloth brush panels rotate in a reverse rotation with a direction of travel of a vehicle, and can be mixed and matches with various sizes and shapes.

15 Claims, 20 Drawing Sheets

(56) References Cited

U.S. PATENT DOCUMENTS

| | | | |
|---|---|---|---|
| 7,569,006 B1* | 8/2009 | Liu | B23Q 3/15526 |
| | | | 483/58 |
| 7,743,511 B2* | 6/2010 | Jerez | A01D 34/416 |
| | | | 30/276 |
| D633,928 S | 3/2011 | Nilsson et al. | |
| D651,874 S | 1/2012 | Davidian et al. | |
| 8,393,044 B2* | 3/2013 | Favagrossa | B60S 3/06 |
| | | | 15/230.19 |
| 8,544,373 B2* | 10/2013 | Howe | B23D 61/025 |
| | | | 83/663 |
| D697,778 S | 1/2014 | Bozic | |
| 8,695,224 B2* | 4/2014 | Gehret | B23D 45/16 |
| | | | 30/388 |
| 10,549,728 B1* | 2/2020 | Fitzsimmons | B60S 3/063 |
| 2002/0002892 A1* | 1/2002 | DiSabatino | A01G 23/091 |
| | | | 83/835 |
| 2002/0002971 A1 | 1/2002 | Spangenberg | |
| 2002/0112589 A1 | 8/2002 | Lee et al. | |
| 2003/0000092 A1* | 1/2003 | Liu | B23D 51/10 |
| | | | 30/519 |
| 2003/0136010 A1* | 7/2003 | Childs | B27B 5/32 |
| | | | 30/388 |
| 2004/0200024 A1* | 10/2004 | Yamin | B60S 3/066 |
| | | | 15/230.16 |
| 2008/0017006 A1 | 1/2008 | Burke | |
| 2010/0154153 A1* | 6/2010 | Hooper | A46B 3/10 |
| | | | 15/104.05 |
| 2010/0180454 A1* | 7/2010 | Cheng | B23D 45/10 |
| | | | 30/388 |

* cited by examiner

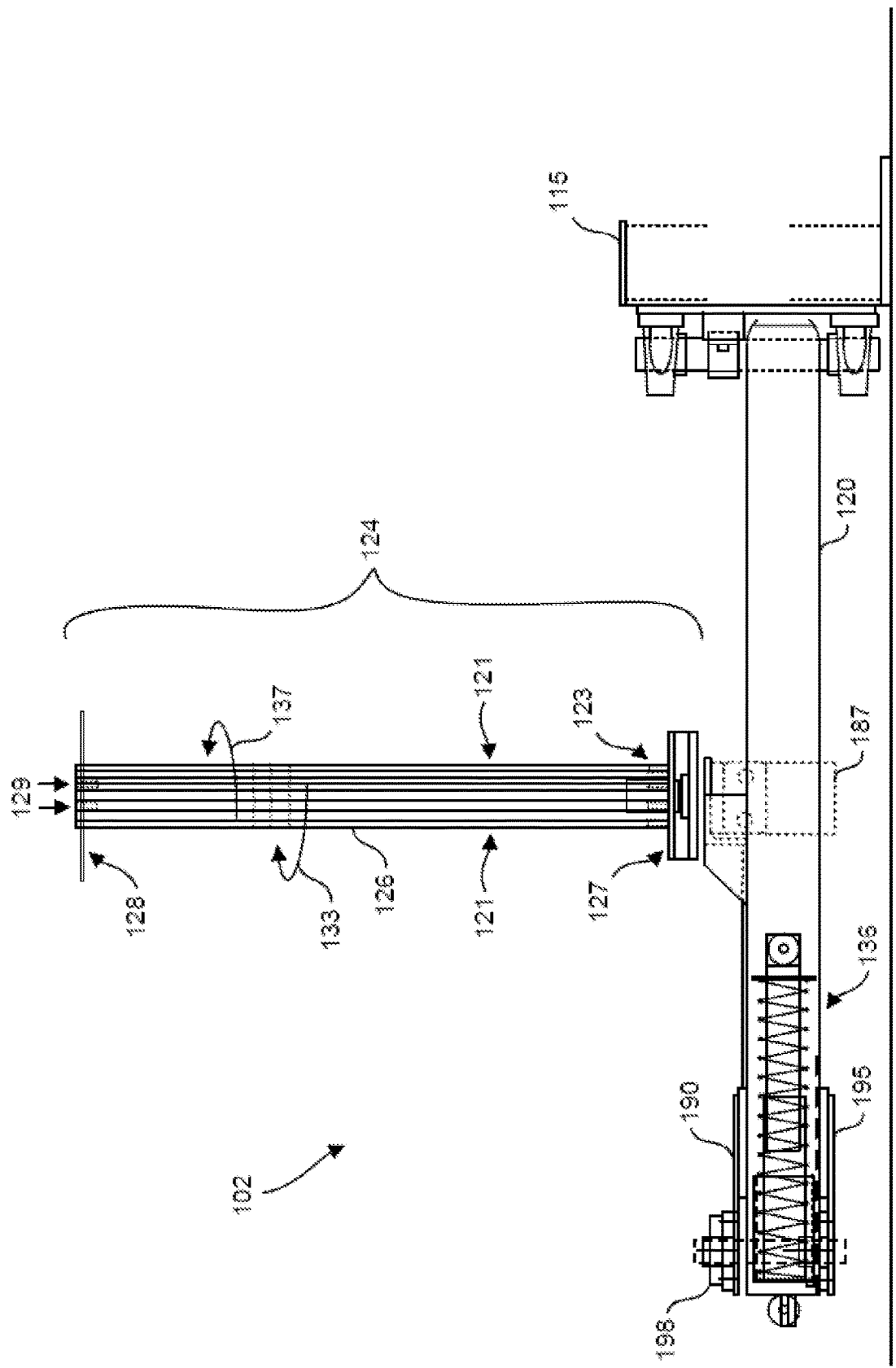

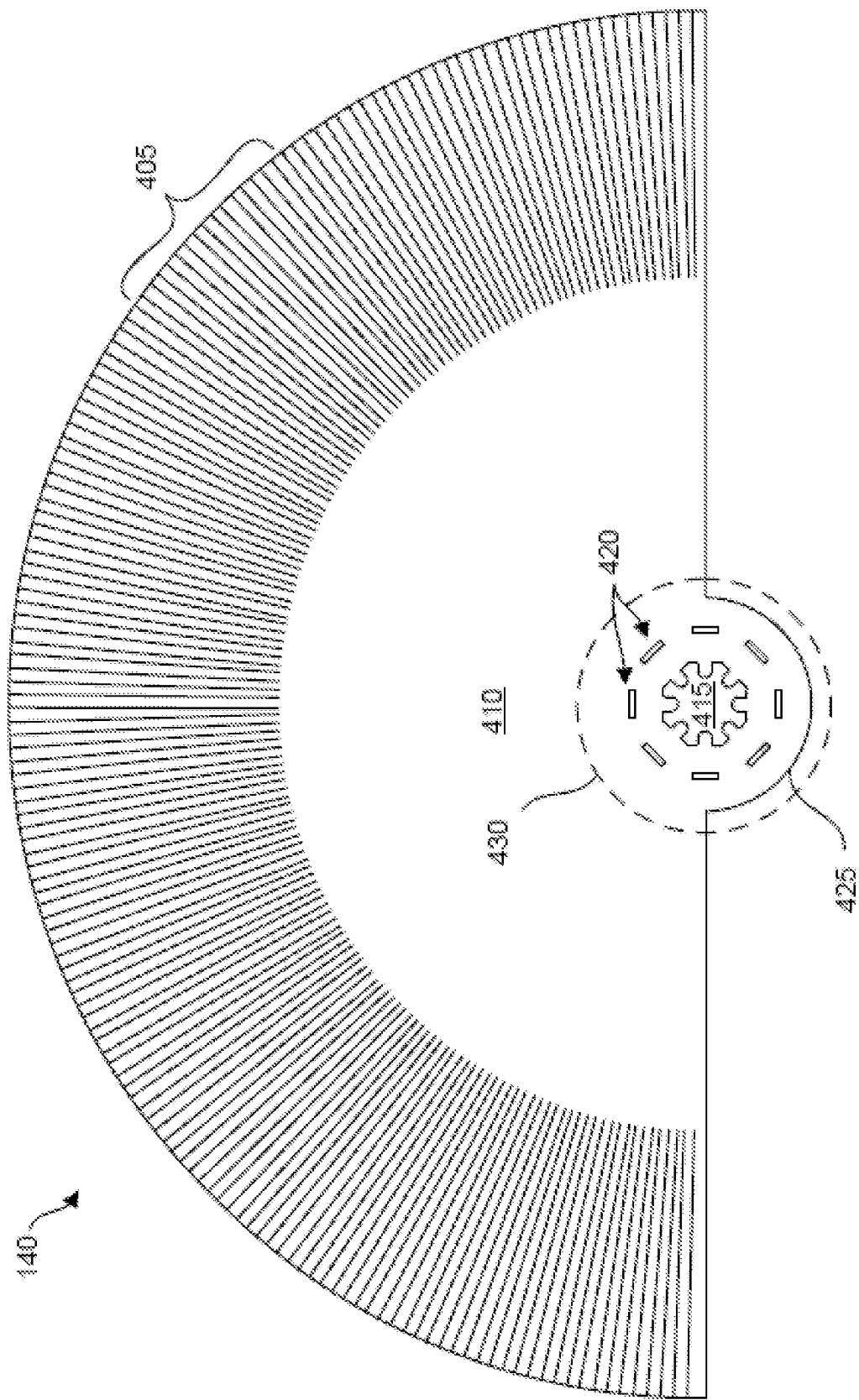

REVERSE ROTATION SIDE WASHER FOR VEHICLES INCLUDING A SHAFT ASSEMBLY AND RETROFIT DISCS

RELATED APPLICATION DATA

This application is a divisional of commonly-owned U.S. application Ser. No. 15/422,377, filed Feb. 1, 2017, which claims the benefit of commonly-owned U.S. provisional patent application Ser. No. 62/291,252, filed Feb. 4, 2016, which are hereby incorporated by reference.

TECHNICAL FIELD

This application pertains to vehicle washing technology, and more particularly, to a reverse rotation side washer for vehicles.

BACKGROUND

Automatic vehicle wash systems have proliferated in recent years. The convenience and quality of wash afforded by such vehicle wash systems have improved to the point that most kinds of vehicles can be washed using such systems. Nevertheless, conventional vehicle wash systems are deficient in that they often miss cleaning certain areas of the vehicle including portions of the sides and wheels of the vehicle. Conventional vehicle wash systems use non-reverse rotation side washers. Such non-reverse rotation side washers are simple to implement, but fall short in their cleaning efficacy. Running a conventional side washer in a reverse rotation direction is dangerous because the natural behavior of the brushes is to pull themselves into the vehicle and grab, thereby damaging the vehicle.

Conventional cloth attachment cores and hubs are very difficult to maintain when it comes time to replace new cloth. After being exposed in a carwash environment over time, the slots in the cores and hubs expand and weaken. As a result, the cloth material pulls and falls out of the slots, therefore requiring replacement and purchase of a new core or hub every few years. Another problem with conventional cores is it is very difficult to change the cloth material when needed because the cloth becomes very difficult to slide out of the core or hub over time. These are time consuming and expensive tasks.

Accordingly, a need remains for improved methods and systems for providing a reverse rotation side washer for vehicles, and for retrofitting conventional systems. Embodiments of the inventive concept address these and other limitations in the prior art.

BRIEF DESCRIPTION OF THE DRAWINGS

FIG. 1B illustrates an example side elevation-view diagram of the side washer assembly without the stack of cloth brush panels.

FIG. 4A illustrates an example semicircular (½) cloth brush panel in accordance with various embodiments of the present inventive concept.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first component could be termed a component, and, similarly, a second component could be termed a first component, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1A:
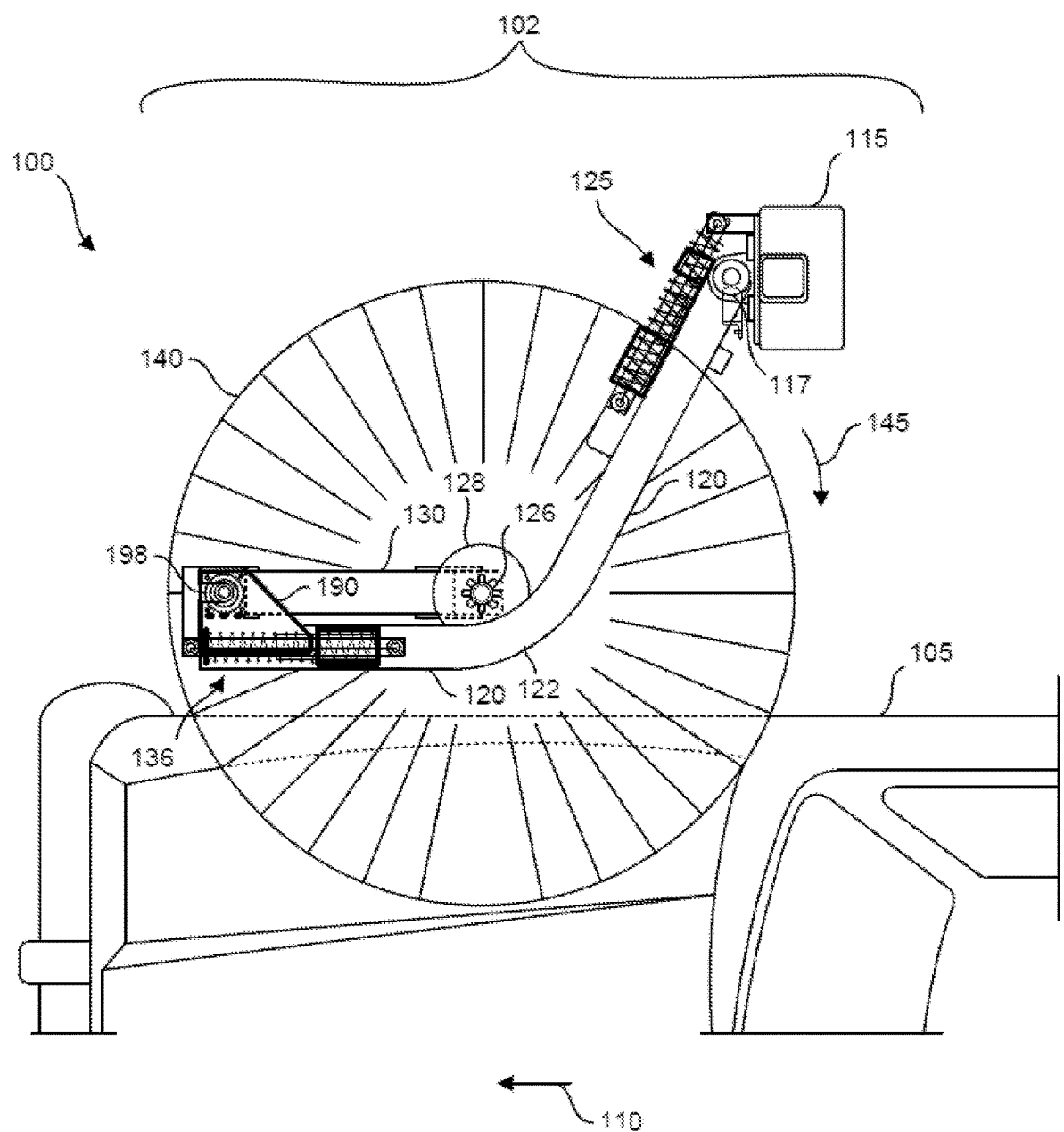
FIG. 1A illustrates an example plan-view diagram of a vehicle and a reverse rotation side washer system for the vehicle, including a side washer assembly having a stack of horizontal cloth brush panels in accordance with various embodiments of the present inventive concept.
Figure 1C:
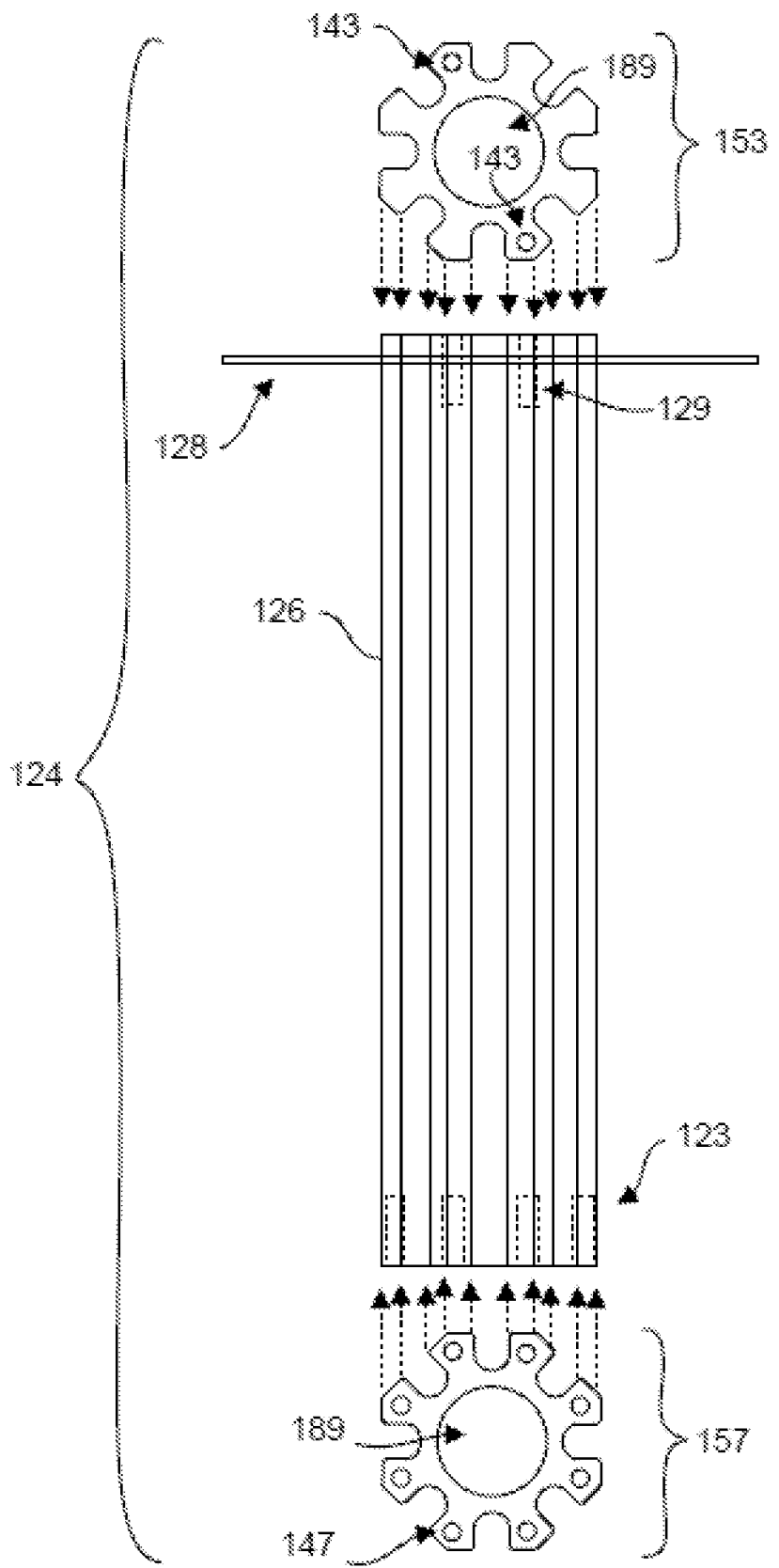
FIG. 1C illustrates an example side elevation-view of a shaft assembly of FIG. 1B, and top and bottom views of the shaft assembly of FIG. 1B.

FIG. 1A illustrates an example plan-view diagram of a vehicle 105 and a reverse rotation side washer system 100 for the vehicle 105, including a side washer assembly 102 having a stack of horizontal cloth brush panels 140 in accordance with various embodiments of the present inventive concept. FIG. 1B illustrates an example side elevation-view diagram of the side washer assembly 102 without the stack of cloth brush panels 140. FIG. 1C illustrates an example side elevation-view of a shaft assembly 124 of FIG. 1B, and top and bottom views of the shaft assembly 124 of FIG. 1B. Reference is now made to FIGS. 1A, 1B, and 1C.

The vehicle 105 can be an automobile, a passenger vehicle, a self-driving vehicle, a truck, a van, or the like. The vehicle 105 can travel in a particular direction 110, either by its own motive force, or by an external motive force. For example, the vehicle 105 can travel in the direction 110 by way of an automatically guided track system (not shown).

The reverse rotation side washer system 100 can include a side washer assembly 102 disposed on one side thereof. The side washer assembly 102 can include a stack of horizontal cloth brush panels 140 that can be rotated in a reverse direction 145. The term "reverse direction" as used herein refers to a direction of rotation that is with rather than against the direction of travel 110 of the vehicle 105. In other words, in the reverse direction, the side washer assembly is rotated as if it were assisting the vehicle in the direction of travel 110. Put differently, the reverse direction is opposite to the direction of rotation of conventional side washer vehicle washing systems.

The side washer assembly 102 can include a retractable angled primary arm 120 and a retractable secondary arm 130. The retractable angled primary arm 120 can retract out and away from the vehicle 105 as the vehicle 105 makes contact with the stack of cloth brush panels 140. More specifically, the retractable angled primary arm 120 can pivot away from the vehicle 105 by way of pivot 117. The retractable angled primary arm 120 can include an elbow, joint, or rounded oblique bend 122. Moreover, the retractable secondary arm 130 can extend and retract out and away from the angled primary arm 120, and further extend and retract out and away from the vehicle 105, thereby keeping the reverse rotation of the stack of cloth brush panels 140 from applying excessive pressure, tension, and force on the side of the vehicle 105, and preventing the angled primary arm 120 from otherwise being pulled into the vehicle 105.

The retractable angled primary arm 120 and the retractable secondary arm 130 can be joined at pivot 198. The pivot 198 is a retraction point of the cloth brush panels 140, and together with the angled primary arm 120 allows for both the primary arm 120 and the secondary arm 130 to retract away from the vehicle 105 when pressure is applied on the side of the vehicle 105. An upper bracket 190 and a lower bracket 195 (as shown in FIG. 1B) can provide structural support to the pivot 198 or other suitable coupling between the secondary arm 130 and the primary arm 120. Accordingly, the cloth brush panels 140 behave gently and smoothly in reverse rotation. The retractable angled primary arm 120 and the retractable secondary arm 130 work in tandem for a gentle, safe, and effective cleaning of the areas of the sides and wheels of the vehicle 105 that conventional non-reverse rotation side washers miss. In an alternative embodiment, the cloth brush panels 140 can be rotated in a non-reverse rotation direction against the travel direction of the vehicle 105.

The retractable angled primary arm 120 and the retractable secondary arm 130 can be constructed of any suitable rigid material such as metal, steel, aluminum, stainless steel, standard steel, round pipe, box style steel tubing, or the like. The retractable angled primary arm 120 can be coupled to a floor mount 115. In some embodiments, the floor mount 115 can be a freestanding floor mount. A primary shock and spring assembly 125 coupled to the floor mount 115 and the retractable angled primary arm 120 can assist in the retraction of the angled primary arm 120 and prevent the angled primary arm 120 from damaging the vehicle 105. The primary shock and spring assembly 125 can include a tensioner spring. In some embodiments, an inside-mounted secondary shock and spring assembly 136, which can be disposed within the retractable angled primary arm 120, and coupled to the retractable secondary arm 130, can assist in the retraction of the secondary arm 130, to further prevent any damage to the vehicle 105. The secondary shock and spring assembly 136 can include a tensioner spring. Although some figures described and illustrated herein show the internal secondary shock and spring assembly 136, it will be understood that an external secondary shock and spring assembly 135, further described below, can be substituted in each illustrated embodiment for the internal secondary shock and spring assembly 136 without departing from the various embodiments of the inventive concept disclosed herein.

The side washer assembly 102 can include a shaft assembly 124, as shown in FIG. 1B. The shaft assembly 124 can support the stack of cloth brush panels 140. In other words, the stack of cloth brush panels 140 can be secured and rotated by the shaft assembly 124, as further described in detail below. The shaft assembly 124 can include an upright shaft 126 and a cap plate 128 secured to the shaft 126. The cap plate 128 can be secured to the shaft 126 using, for example, two or more screws, pins, or bolts 129. The shaft 126 is preferably about 28 inches long. It will be understood that other suitable shaft lengths include, for example, 21 inches, 28 inches, 35 inches, 42 inches, etc. The shaft 126 can have a three inch diameter or thereabout. The shaft assembly 124 can include a base plate 127. The shaft 126 can be secured to the base plate 127 using two or more screws, pins, or bolts 123, which can be secured to the retractable secondary arm 130 and the motor 187. The motor 187 can cause the shaft 126 to rotate in either the direction 133 or the direction 137.

A cross section 121 taken along line 121-121 of the shaft 126 can be round, square, rectangular, triangular, octagonal, or any suitable shape for stacking the horizontal cloth brush panels 140, which obviate the need for conventional brush cores. The shaft 126 can be used with cloth brush panels 140 in various forms including whole round panels, semicircular half (½) panels, quarter circular (¼) panels, and/or eighth circular (⅛) panels, as further described below. Custom stacking and spacing patterns of the cloth brush panels 140 can be configured so that sides and edges of the cloth brush panels 140 down to even a hundred thousandth of an inch can clean the nooks and crannies of the vehicle 105. The cloth brush panels 140 can be horizontally disposed and stacked, with the shaft 126 running up the middle of the stack. The shaft assembly 124, along with the cloth brush panels 140, can rotate in direction 133 and/or 137. In an alternative embodiment, conventional vertical cloth brush panels can be retrofitted to the shaft 126, as further described in detail below.

As shown in FIG. 1C, the shaft assembly 124 can include the shaft 126, the cap plate 128, screws, pins, or bolts 129 to secure the cap plate 128, and screws, pins, or bolts 123 to secure the shaft 126 to the base plate 127 (of FIG. 1B). A top view 153 of the shaft 126 shows drill holes 143, which can align with and receive the corresponding screws, pins, or bolts 129 to secure the cap plate 128. In some embodiments, a slot can be disposed about one inch below a top surface of the shaft 126 and continue around the shaft 126 to allow for the cap plate 128 to be slid down the shaft 126 and rotated into the slot of the side of the shaft 126 to lock in place, thereby aligning with the drill holes 143. A bottom view 157 of the shaft 126 shows drill holes 147, which can align with and receive the corresponding screws, pins, or bolts 123. The base plate 127 (of FIG. 1B) can include holes that correspond with the drill holes 147 to mount the shaft assembly 124 to the retractable secondary arm 130 and the motor 187. In some embodiments, a central opening 189 can be bored or otherwise formed throughout the entire center of the shaft 126. In some embodiments, the central opening 189 can have a diameter of one and half inches or thereabout. The central opening 189 can reduce the amount of material needed to construct the shaft 126 while maintaining the necessary rigidity and strength of the shaft 126.

Figure 1D:
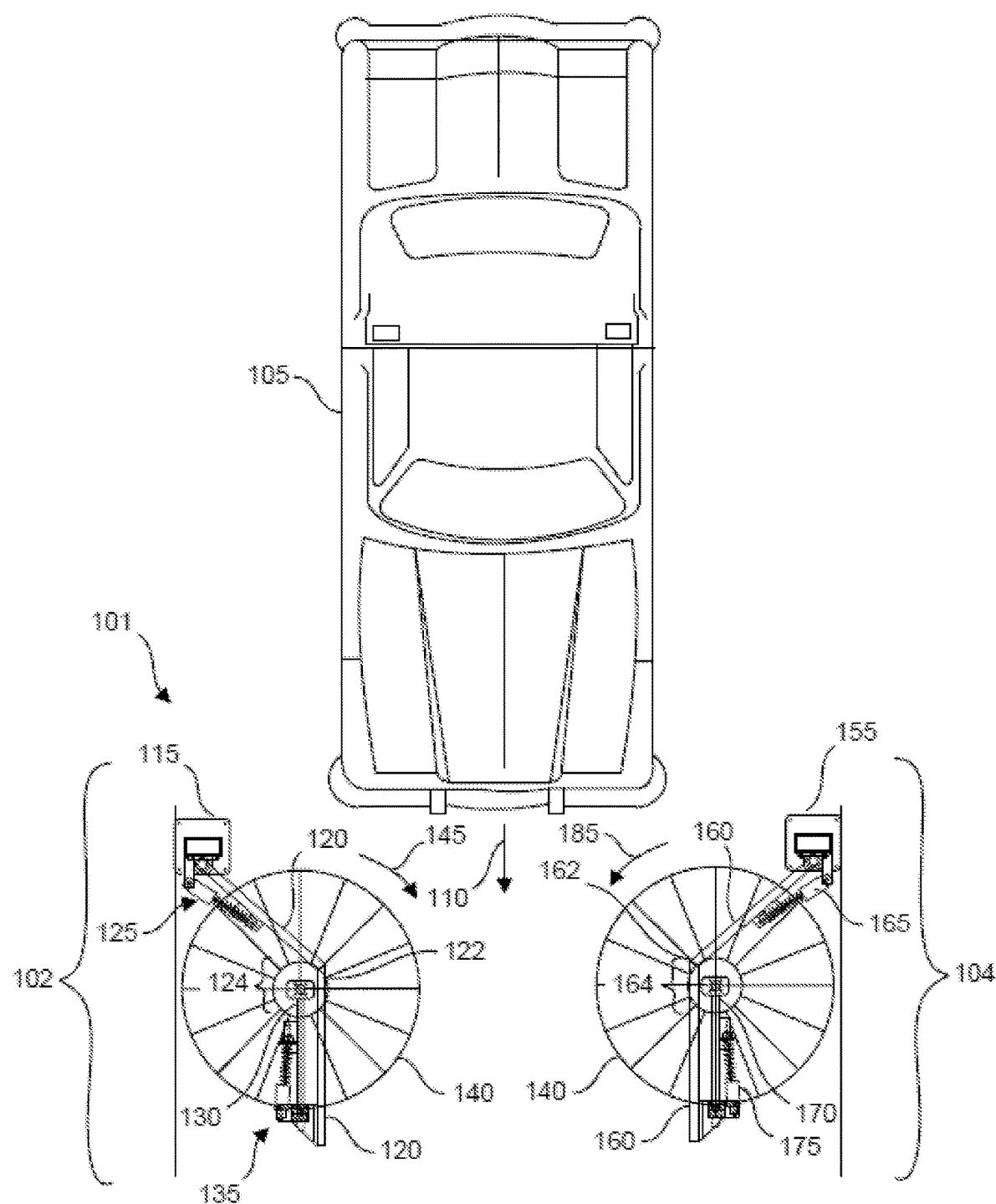
FIG. 1D illustrates an example diagram of a vehicle and a reverse rotation side washer system for the vehicle in accordance with various embodiments of the present inventive concept.

FIG. 1D illustrates an example diagram of a vehicle 105 and a reverse rotation side washer system 101 for the vehicle 105 in accordance with various embodiments of the present inventive concept. The vehicle 105 can be an automobile, a passenger vehicle, a self-driving vehicle, a truck, a van, or the like. The vehicle 105 can travel in a particular direction 110, either by its own motive force, or by an external motive force. For example, the vehicle 105 can travel in the direction 110 by way of an automatically guided track system (not shown).

The reverse rotation side washer system 101 can include a first side washer assembly 102 disposed on one side thereof, and a second side washer assembly 104 disposed on the opposite side thereof. The first side washer assembly 102 can include a stack of cloth brush panels 140 that can be rotated in a reverse direction 145. The second side washer assembly 104 can include a stack of horizontal cloth brush panels 140 that can be rotated in a reverse direction 185.

The first side washer assembly 102 can include a retractable angled primary arm 120 and a retractable secondary arm 130. The retractable angled primary arm 120 can retract out and away from the vehicle 105 as the vehicle 105 makes contact with the stack of cloth brush panels 140. The rectractable angled primary arm 120 can include an elbow or joint 122. The retractable secondary arm 130 can further extend and retract out and away from the vehicle 105, thereby keeping the reverse rotation of the stack of cloth brush panels 140 from applying excessive pressure, tension, and force on the side of the vehicle 105. The retractable angled primary arm 120 and the retractable secondary arm 130 work in tandem for a gentle, safe, and effective cleaning of the areas of the sides and wheels of the vehicle 105 that conventional non-reverse rotation side washers miss.

Figure 2A:
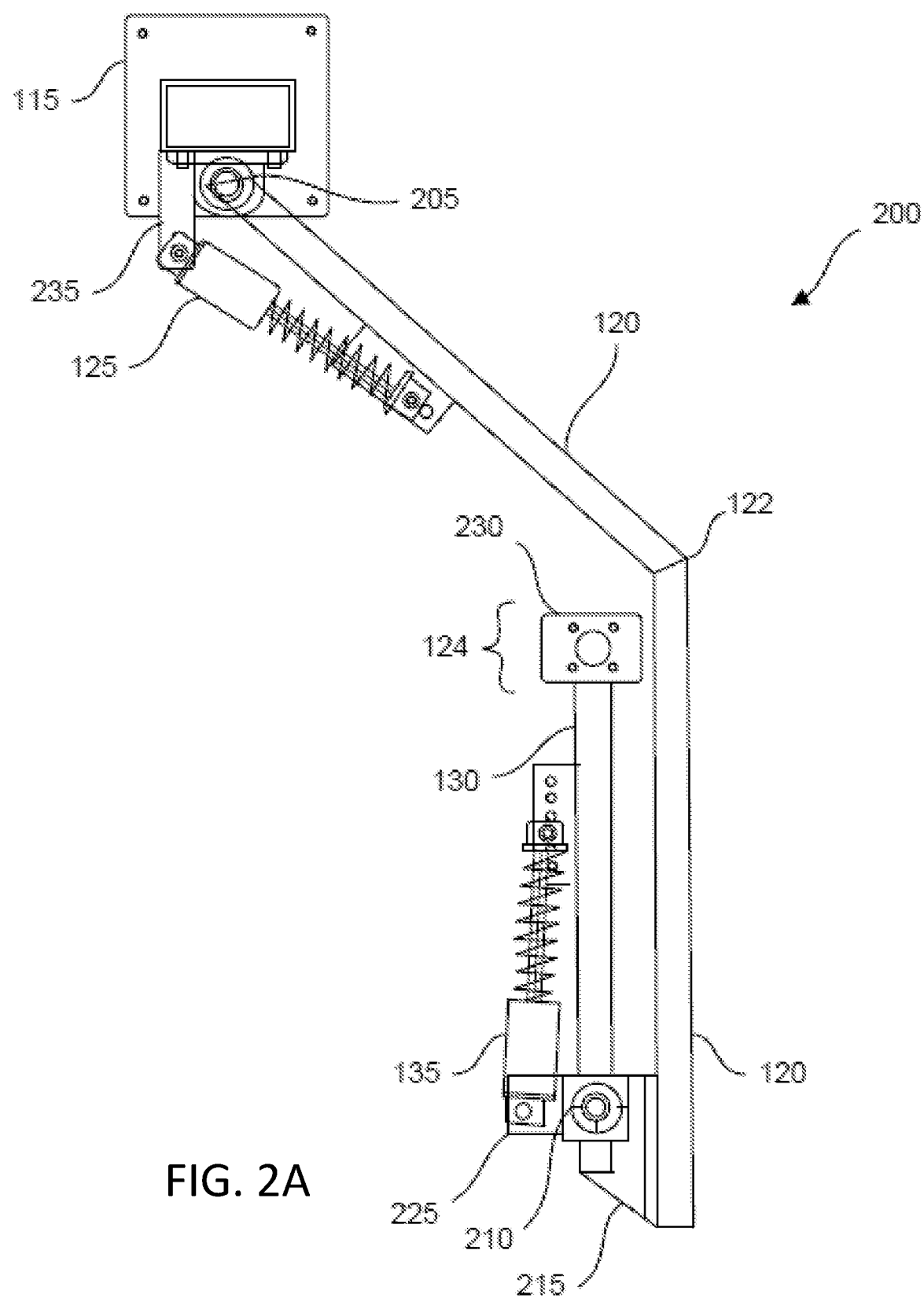
FIG. 2A illustrates an example plan view of a reverse rotation side washer arm assembly of the reverse rotation side washer system of FIG. 1D.
Figure 2B:
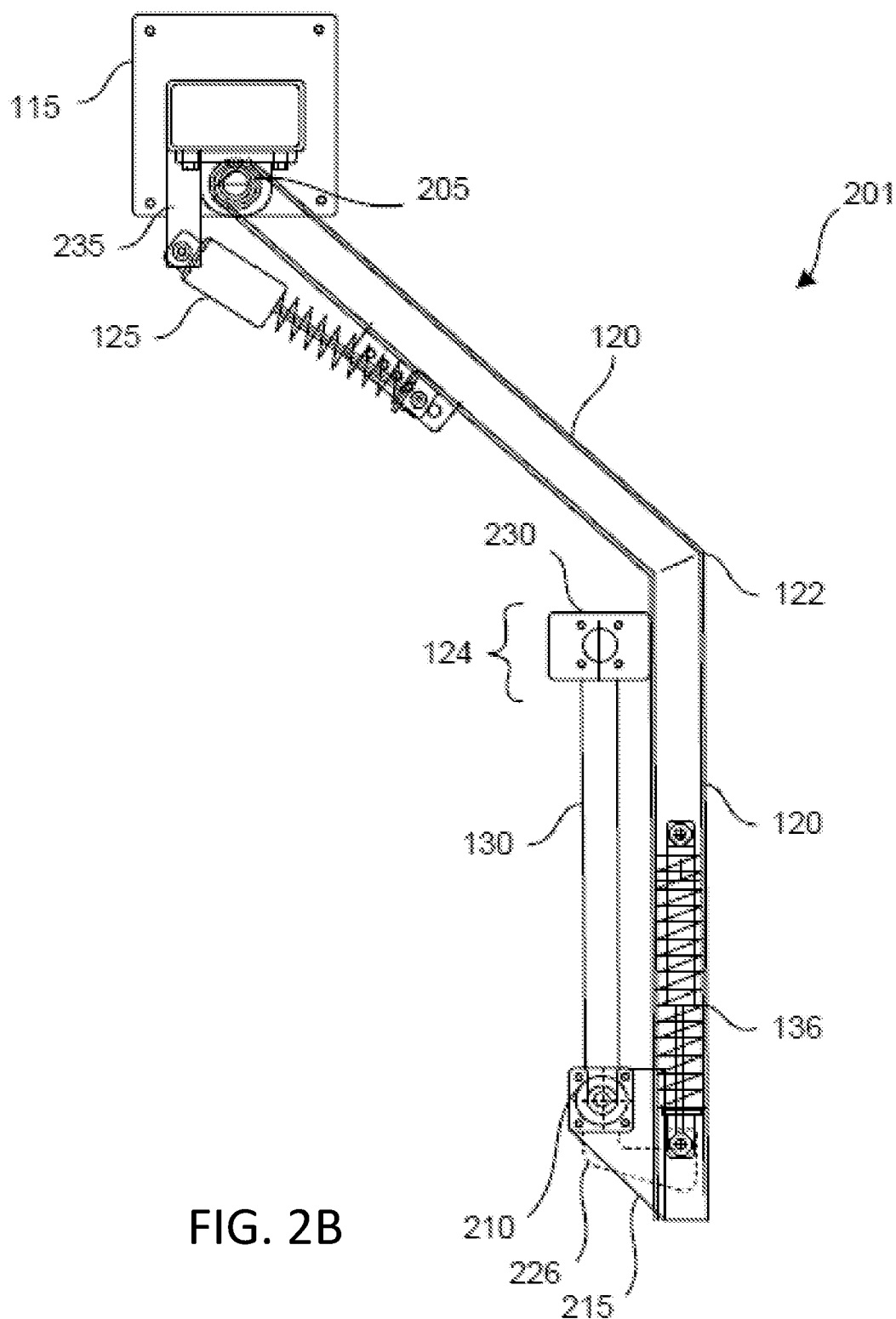
FIG. 2B illustrates an example plan view of a reverse rotation side washer arm assembly of the reverse rotation side washer system of FIG. 1D, including an inside-mounted spring and shock assembly in accordance with various embodiments of the present inventive concept.

The retractable angled primary arm 120 can be coupled to a floor mount 115. In some embodiments, the floor mount 115 can be a freestanding floor mount. A primary shock and spring assembly 125 coupled to the floor mount 115 and the retractable angled primary arm 120 can assist in the retraction of the angled primary arm 120 and prevent the angled primary arm 120 from damaging the vehicle 105. In one example embodiment, as shown in FIG. 2A, an external secondary shock and spring assembly 135 coupled to the retractable secondary arm 130 can assist in the retraction of the secondary arm 130, to further prevent any damage to the vehicle 105. In an alternative example embodiment, as shown in FIGS. 1A and 2B, an inside-mounted secondary shock and spring assembly 136, which can be disposed within the retractable angled primary arm 120, and coupled to the retractable secondary arm 130, can assist in the retraction of the secondary arm 130, to further prevent any damage to the vehicle 105. Although some figures described and illustrated herein show the external secondary shock and spring assembly 135, it will be understood that the internal secondary shock and spring assembly 136 can be substituted in each illustrated embodiment for the external secondary shock and spring assembly 135 without departing from the various embodiments of the inventive concept disclosed herein.

The first side washer assembly 102 can include a shaft assembly 124. The shaft assembly 124 can support the stack of cloth brush panels 140. In other words, the stack of cloth brush panels 140 can be secured and rotated by the shaft assembly 124, as further described in detail above and below.

The second side washer assembly 104 can include a retractable angled primary arm 160 and a retractable secondary arm 170. The retractable angled primary arm 160 can retract out and away from the vehicle 105 as the vehicle 105 makes contact with the stack of cloth brush panels 140. The rectractable angled primary arm 160 can include an elbow or joint 162. The retractable secondary arm 170 can further extend and retract out and away from the vehicle 105, thereby keeping the reverse rotation of the stack of cloth brush panels 140 from applying excessive pressure, tension, and force on the side of the vehicle 105. The retractable angled primary arm 160 and the retractable secondary arm 170 work in tandem for a gentle, safe, and effective cleaning of the areas of the sides and wheels of the vehicle 105 that conventional non-reverse rotation side washers miss.

The retractable angled primary arm 160 can be coupled to a floor mount 155. A primary shock and spring assembly 165 coupled to the floor mount 155 and the retractable angled primary arm 160 can assist in the retraction of the angled primary arm 160 and prevent the angled primary arm 160 from damaging the vehicle 105. The primary shock and spring assembly 160 can include a tensioner spring. In some embodiments, a secondary shock and spring assembly 175, which can be disposed outside of the retractable angled primary arm 160, and coupled to the retractable secondary arm 170, can assist in the retraction of the secondary arm 170, to further prevent any damage to the vehicle 105. The secondary shock and spring assembly 175 can include a tensioner spring.

The second side washer assembly 104 can include a shaft assembly 164. The shaft assembly 164 can support the stack of cloth brush panels 140. In other words, the stack of cloth brush panels 140 can be secured and rotated by the shaft assembly 164, as further described in detail above and below.

Figure 3:
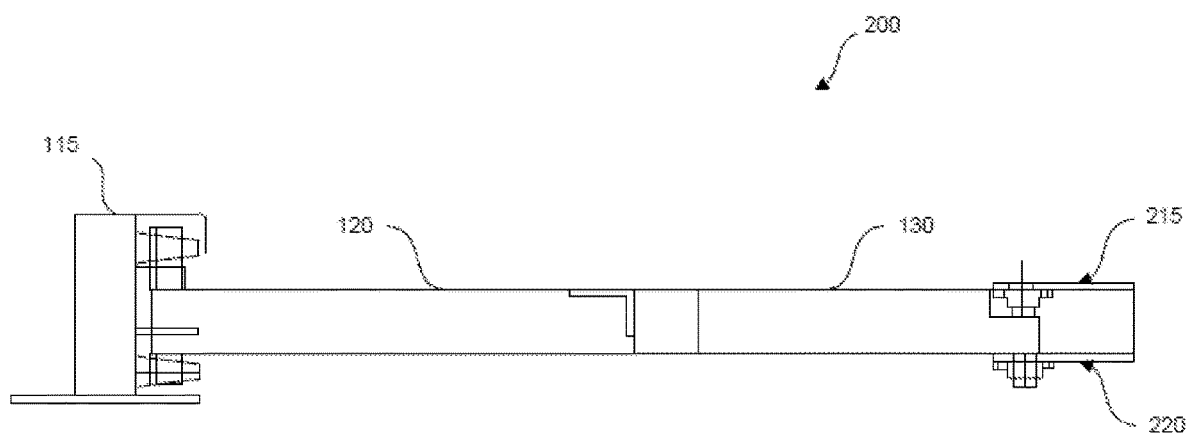
FIG. 3 illustrates an example side elevation view of the reverse rotation side washer arm assembly of the reverse rotation side washer of FIGS. 1, 2A, and 2B.

FIG. 2A illustrates an example plan view of a reverse rotation side washer arm assembly 200 of the reverse rotation side washer system 101 of FIG. 1D. FIG. 2B illustrates an example plan view of a reverse rotation side washer arm assembly 201 of the reverse rotation side washer system 101 of FIG. 1D, including an inside-mounted spring and shock assembly 136 in accordance with various embodiments of the present inventive concept. FIG. 3 illustrates an example side elevation view of the reverse rotation side washer arm assembly 200 of the reverse rotation side washer of FIGS. 1, 2A, and 2B. Reference is now made to FIGS. 2A, 2B, and 3.

The reverse rotation side washer arm assembly 200/201 can include a floor mount 115. The retractable angled primary arm 120 can be coupled to the floor mount 115 by a rotational joint or pivot 205 or other suitable coupling. The retractable angled primary arm 120 can be coupled to the secondary arm 130 by a rotational joint or pivot 210 or other suitable coupling. An upper bracket 215 and a lower bracket 220 can provide structural support to the rotational joint or pivot 210 or other suitable coupling between the secondary arm 130 and the primary arm 120.

The reverse rotation side washer arm assembly 200/201 can include a primary shock and spring assembly 125 coupled to the floor mount 115 via connector 235, and to the retractable angled primary arm 120, which can assist in the retraction of the angled primary arm 120. In an example embodiment, as shown in FIG. 2A, the reverse rotation side washer arm assembly 200 can include an external secondary shock and spring assembly 135 coupled to the retractable secondary arm 130 via connector 225, which can assist in the retraction of the secondary arm 130. In an alternative example embodiment, as shown in FIG. 2B, the reverse rotation side washer arm assembly 201 can include an inside-mounted (i.e., internal) secondary shock and spring assembly 136 coupled to the retractable secondary arm 130 via connector 226, which can assist in the retraction of the secondary arm 130. The inside-mounted secondary shock and spring assembly 136 can be disposed within the retractable angled primary arm 120.

The reverse rotation side washer arm assembly 200/201 can include a shaft assembly 124 supported by a shaft and motor base support 230. The shaft assembly 124 and the shaft and motor base support 230 can support the stack of horizontal cloth brush panels 140. In other words, the stack of cloth brush panels 140 can be secured and rotated by the shaft assembly 124 and the shaft and motor base support 230. It will be understood that the reverse rotation side washer arm assembly 200/201 can correspond to the arm assembly of the first side washer assembly 102. Similar features can be present in the second side washer assembly 104. In other words, the first side washer assembly 102 is essentially a mirror of the second side washer assembly 104 and oriented to face each other.

Figure 4B:
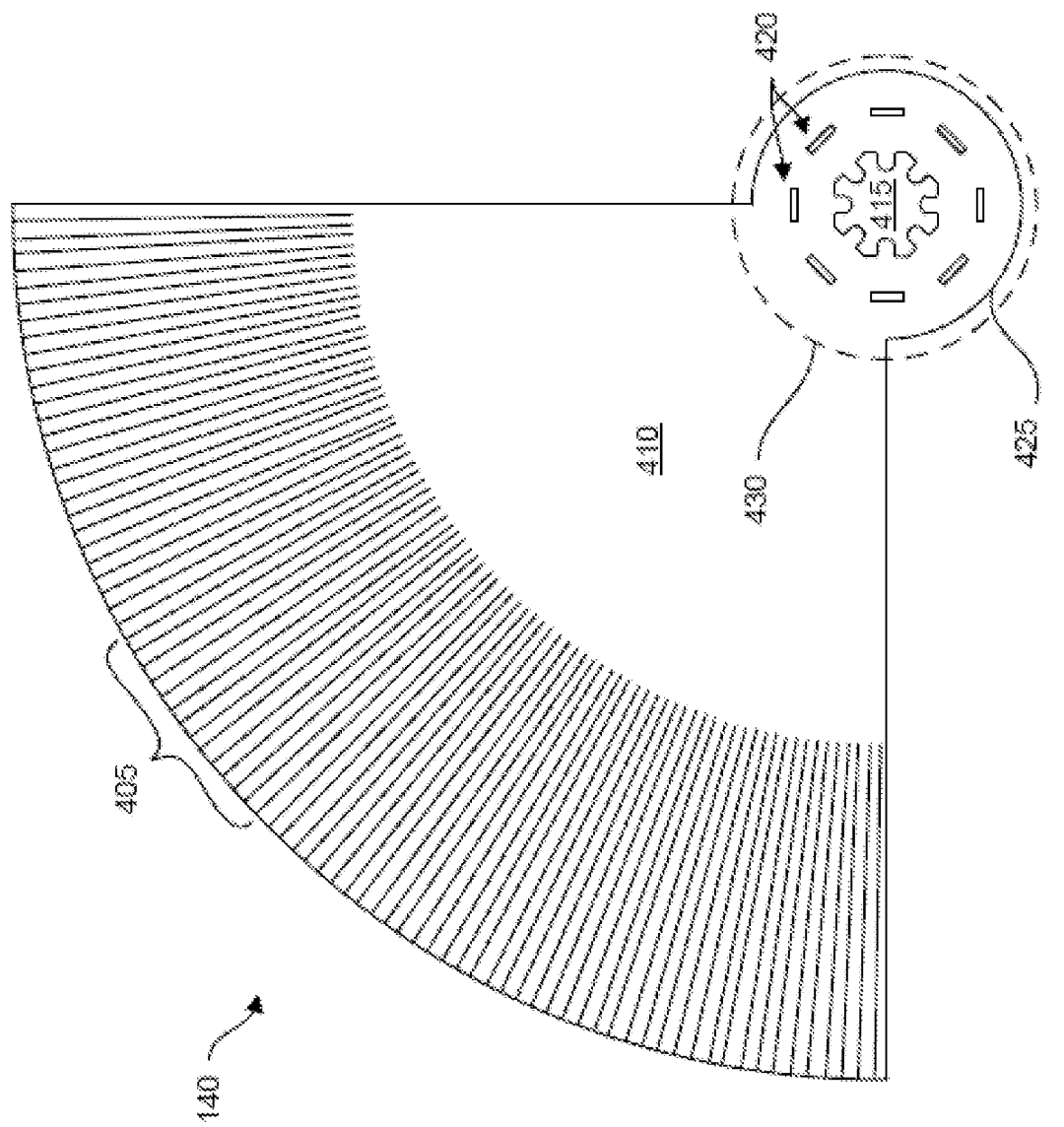
FIG. 4B illustrates an example quarter circular (¼) cloth brush panel in accordance with various embodiments of the present inventive concept.
Figure 4C:
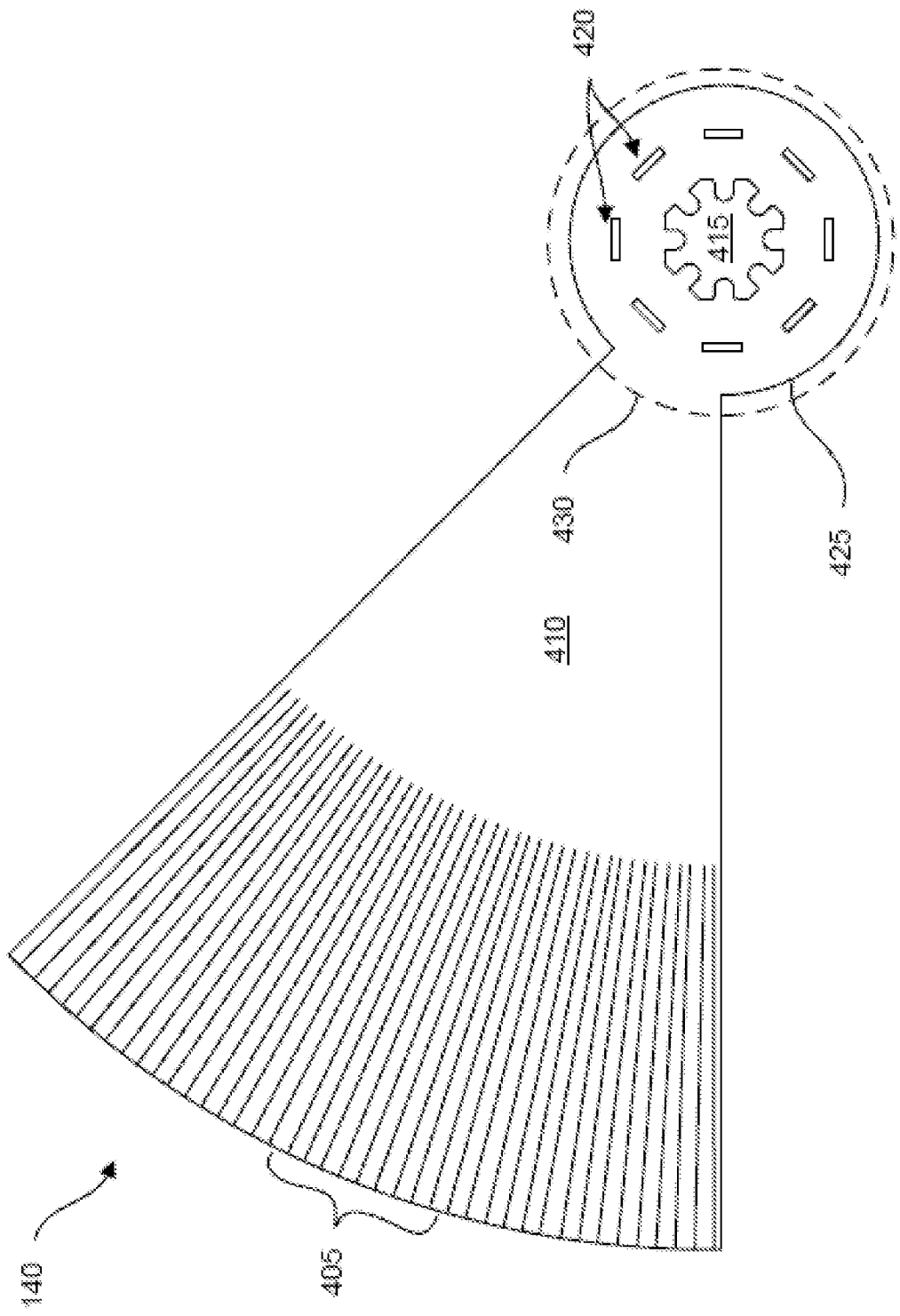
FIG. 4C illustrates an example eighth circular (⅛) cloth brush panel in accordance with various embodiments of the present inventive concept.

FIG. 4A illustrates an example semicircular (½) cloth brush panel (e.g., 140) in accordance with various embodiments of the present inventive concept. FIG. 4B illustrates an example quarter circular (¼) cloth brush panel (e.g., 140) in accordance with various embodiments of the present inventive concept. FIG. 4C illustrates an example eighth circular (⅛) cloth brush panel (e.g., 140) in accordance with various embodiments of the present inventive concept. Reference is now made to FIGS. 4A, 4B, and 4C.

In some embodiments, the shape of the cloth brush panel can be essentially flat and semicircular (i.e., ½ of a circular piece of material), as shown in FIG. 4A. In some embodiments, the shape of the cloth brush panel can be essentially flat and circular (not shown). The semicircular embodiment, however, allows for less material to be used, and therefore less overall system cost, while achieving the same or better cleaning performance. In still other embodiments, the cloth brush panels can be a quarter circular (¼) "pie section" as shown in FIG. 4B, an eighth circular (⅛) "pie section" as shown in FIG. 4C, and so forth.

Each cloth brush panel (e.g., 140) includes a shaft attachment region 430 having a brush shaft opening 415. The brush shaft opening 415 can be cut to match the contours of the shaft 126. For example, the brush shaft openings 415 can be sculpted or otherwise cut with notches to match and fit to the form of the shaft 126. In other words, the brush shaft openings 415 can be sculpted or otherwise cut with notches to match and fit to the notches and protrusions of the shaft 126. The cloth brush panel (e.g., 140) can each include a partial circular portion 425 encircling at least some of the corresponding brush shaft opening 415. Each cloth brush panel (e.g., 140) can include one or more slot openings 420 through which one or more corresponding elongate stays can be inserted. The elongate stays can have an elongated rectangular shape. The elongate stays can have a length that is similar to that of the shaft 126. Each of the elongate stays can be a flat piece of steel that slides down an entire length of the stack of cloth brush panels (e.g., 140), thereby locking them together and aiding in their simultaneous rotation. The elongate stays are described in further detail below.

The orientation of each cloth brush panel (e.g., 140) can be staggered into many possible configurations and patterns. In other words, as the cloth brush panels (e.g., 140) are stacked on the shaft 126, their orientation can be staggered with respect to each other. Put differently, the cloth brush panels (e.g., 140) can be rotated while being stacked onto variable notches on the shaft 126. The density of the cloth brush panels (e.g., 140) can also be controlled or otherwise made dependent on cloth panel fillers or supports disposed between the cloth brush panels, as also further described below.

Each of the horizontal cloth brush panels (e.g., 140) can be cut to include flat fingers 405. The flat fingers 405 can have a length of seven (7) inches, eight (8) inches, nine (9) inches, or ten (10) inches. The flat fingers 405 can each have a width of ¼ inch, ⅜ inch, or ½ inch. It will be understood that the flat fingers 405 can have other suitable dimensions. A contiguous central region 410 can remain essentially uncut. The contiguous central region 410 can be adjacent to the flat fingers 405 on one side, and the brush shaft opening 415 and slot openings 420 on the other side. Because of the flat orientation of each cloth brush panel, the tips of the flat fingers 405 can achieve a cleaning coverage and density of fractions of an inch, thereby allowing for more vehicle surface cleaning coverage. In some embodiments, the edges of the tips of the flat fingers 405 can achieve a cleaning coverage and density of a hundredth of an inch, a thousandth of an inch, or even as fine as a hundred thousandth of an inch. While the cloth brush panels illustrated in FIGS. 4A, 4B, and 4C show example dimensions, it will be understood that other suitable dimensions can be used without departing from the inventive concepts disclosed herein.

Figure 5:
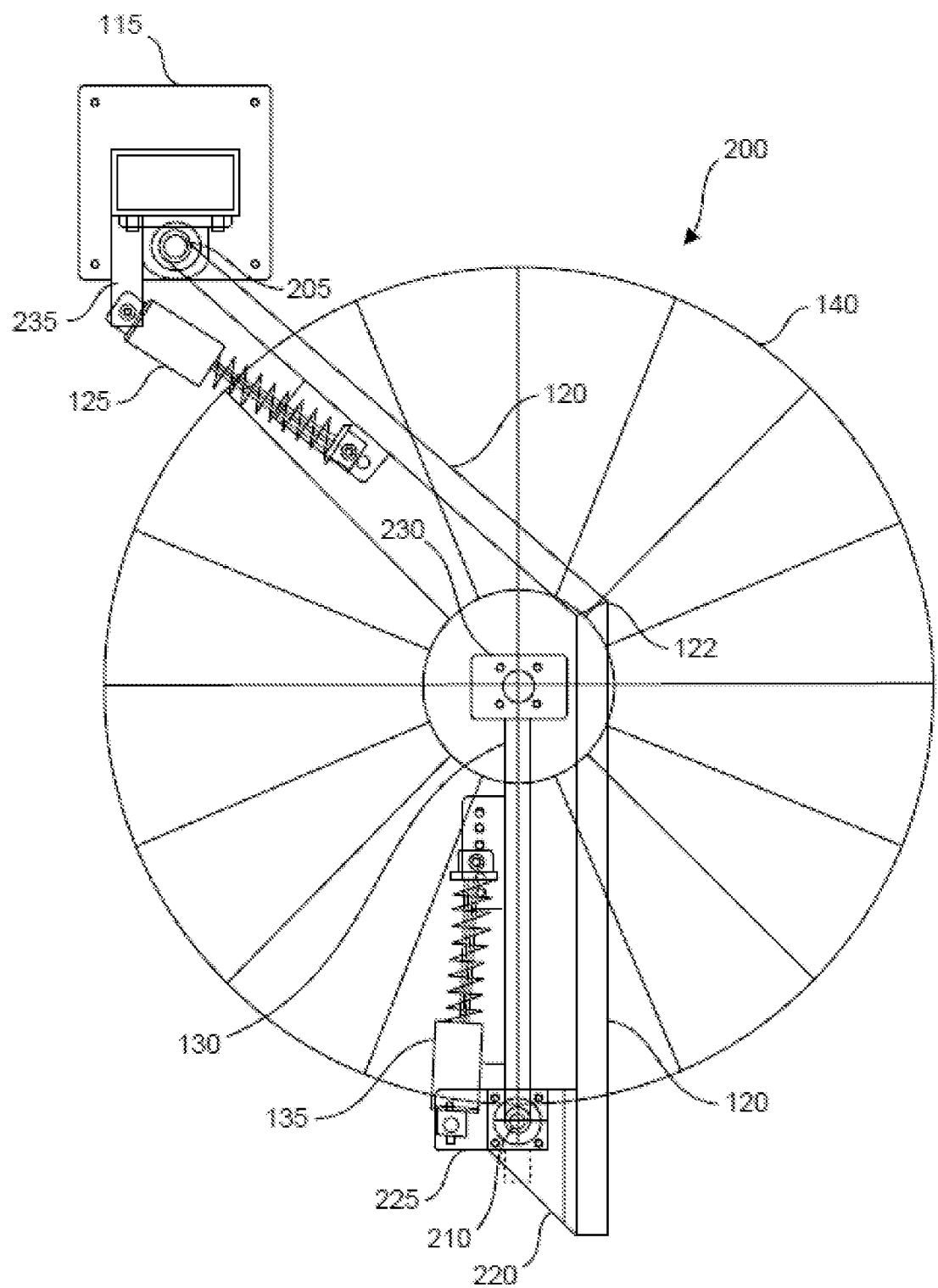
FIG. 5 illustrates an example plan view of a reverse rotation side washer arm assembly including a cloth brush panel of the reverse rotation side washer system of FIG. 1D.

FIG. 5 illustrates an example plan view of a reverse rotation side washer arm assembly 200 including a cloth brush panel 140 of the reverse rotation side washer system 101 of FIG. 1D. The components and associated reference numerals shown in FIG. 5 are described in detail above, and therefore, a detailed description of such components is not repeated.

Figure 6:
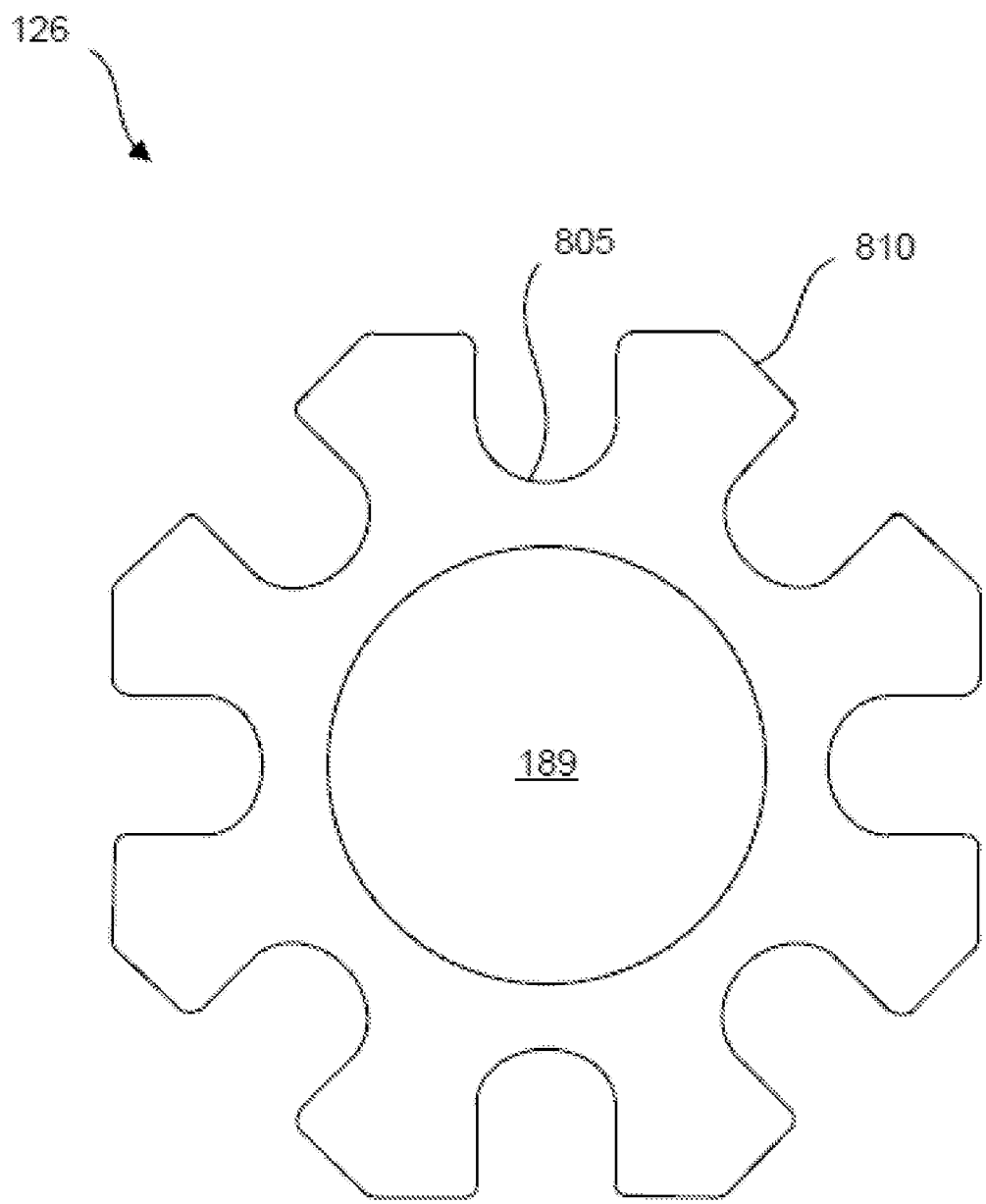
FIG. 6 illustrates an example plan view of the shaft of FIGS. 1A through 1D.

FIG. 6 illustrates an example plan view of the shaft 126 of FIGS. 1A through 1D. The shaft 126 can include notches 805 and protrusions 810. The notches 805 can be U-shaped. For example, the shaft 126 can have a substantially octagonal cross section with U-shaped notches 805 formed therein along its entire length. The protrusions 810 can each have an angled head drawn to an outwardly facing point. A central opening 189 in the center of the shaft 126 can run the entire length of the shaft 126.

In some embodiments, the shaft 216 is twenty-eight (28) inches in length and three (3) inches in diameter with eight ½ inch notches that continue along the sides of the shaft 126 at twenty-two (22) degrees. The notches 805 can be dual-notches, quad-notches, or the like, with variable degrees. The central opening 189 can be a 1.5 inch hole the extends all the way through the center of the shaft 126. It will be understood that the shaft 126 can have different or other suitable dimensions without departing from the inventive concepts disclosed herein.

Figure 7:
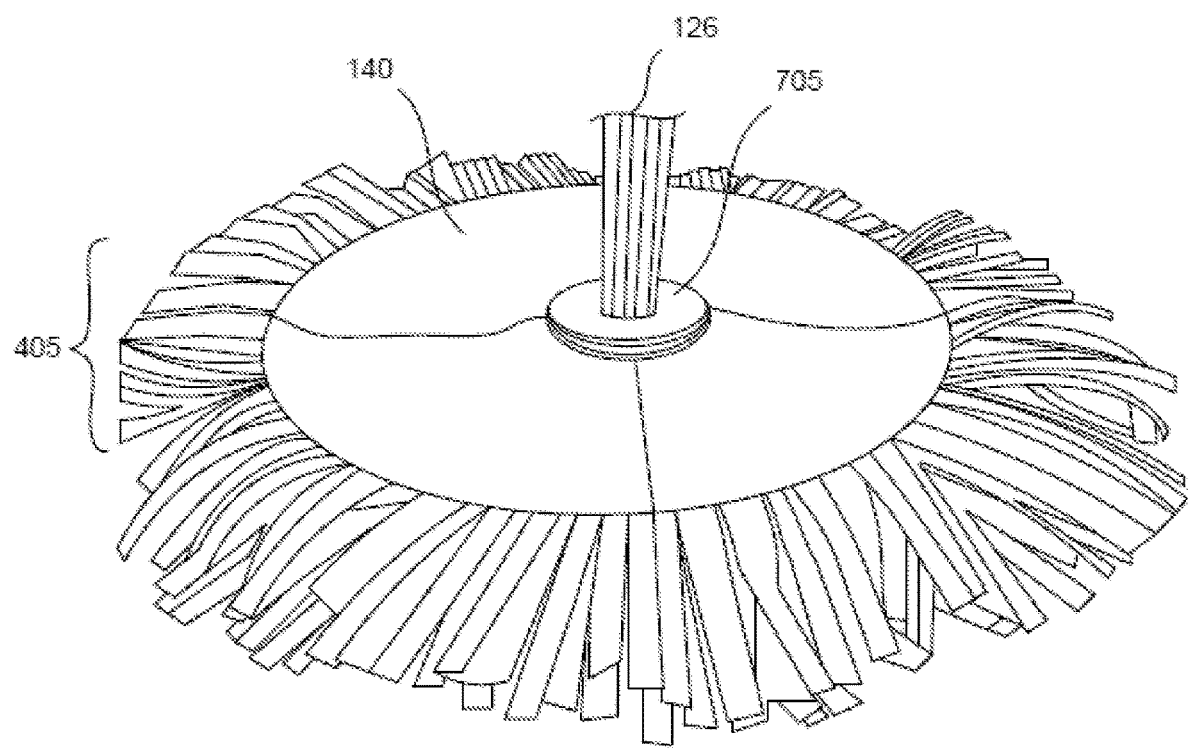
FIG. 7 illustrates an example perspective view of stacked cloth brush panels of the reverse rotation side washer systems of FIGS. 1A through 1D.

FIG. 7 illustrates an example perspective view of stacked cloth brush panels (e.g., 140) of the reverse rotation side washer systems 100/101 of FIGS. 1A through 1D. Some of the components and associated reference numerals shown in FIG. 7 are described in detail above, and therefore, a detailed description of such components is not necessarily repeated.

The horizontal cloth brush panels (e.g., 140) can be stacked on top of each other with the shaft 126 disposed in the center. The density of the cloth brush panels (e.g., 140) can also be controlled or otherwise made dependent on cloth panel fillers 705 or supports disposed between the cloth brush panels (e.g., 140). The fillers 705 or supports can be circular in shape, but have a smaller diameter than the cloth brush panels (e.g., 140). In some embodiments, the fillers or supports can be made of the same material as the cloth brush panels (e.g., 140). The fillers 705 can be about ¼ inch thick, ½ inch thick, or one inch thick. In some embodiments, the fillers 705 can range from six (6) inches to twenty (20) inches in diameter. For example, the fillers 705 can have a diameter of about six (6) inches, eight (8) inches, ten (10) inches, twelve (12) inches, or sixteen (16) inches. It will be understood that the fillers 705 can have other suitable dimensions for allowing space between the individual or groups of cloth brush panels (e.g., 140) down along the shaft 126. The rectangular steel stays can pass through the fillers 705 in addition to the cloth brush panels (e.g., 140), thereby locking the fillers 705 and the cloth brush panels (e.g., 140) together and aiding in their simultaneous rotation.

In some embodiments, the fillers or supports can be made of a different material than the cloth brush panels (e.g., 140). The cloth brush panels (e.g., 140) can be stacked in many various configurations and mixed and matched with semi-circular (½) panels, quarter circular (¼) panels, and/or eighth circular (⅛) panels. Custom stacking and spacing patterns of the cloth panel fillers 705 and the cloth brush panels (e.g., 140) can be implemented to wash using sides and edges of the cloth down to even a hundred thousandth of an inch to clean the nooks and crannies of the vehicle 105.

Figure 8:
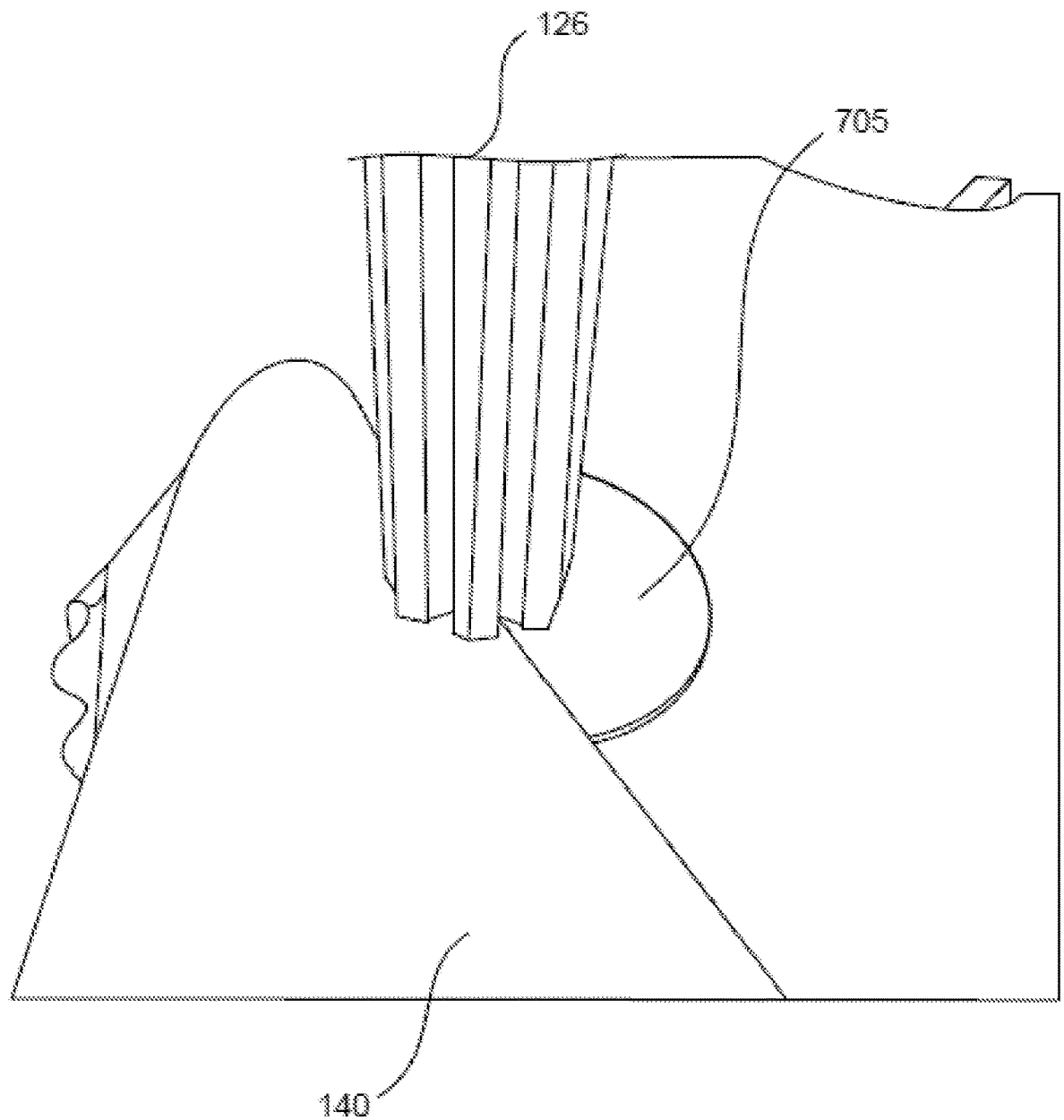
FIG. 8 illustrates an example perspective view of the shaft and stacked cloth brush panels of the reverse rotation side washer systems of FIGS. 1A through 1D.

FIG. 8 illustrates an example perspective view of the shaft 126 and stacked cloth brush panels (e.g., 140) of the reverse rotation side washer systems 100/101 of FIGS. 1A through 1D. Some of the components and associated reference numerals shown in FIG. 8 are described in detail above, and therefore, a detailed description of such components is not necessarily repeated. The fillers 705 can be disposed between different layers of the cloth brush panels (e.g., 140).

Figure 9:
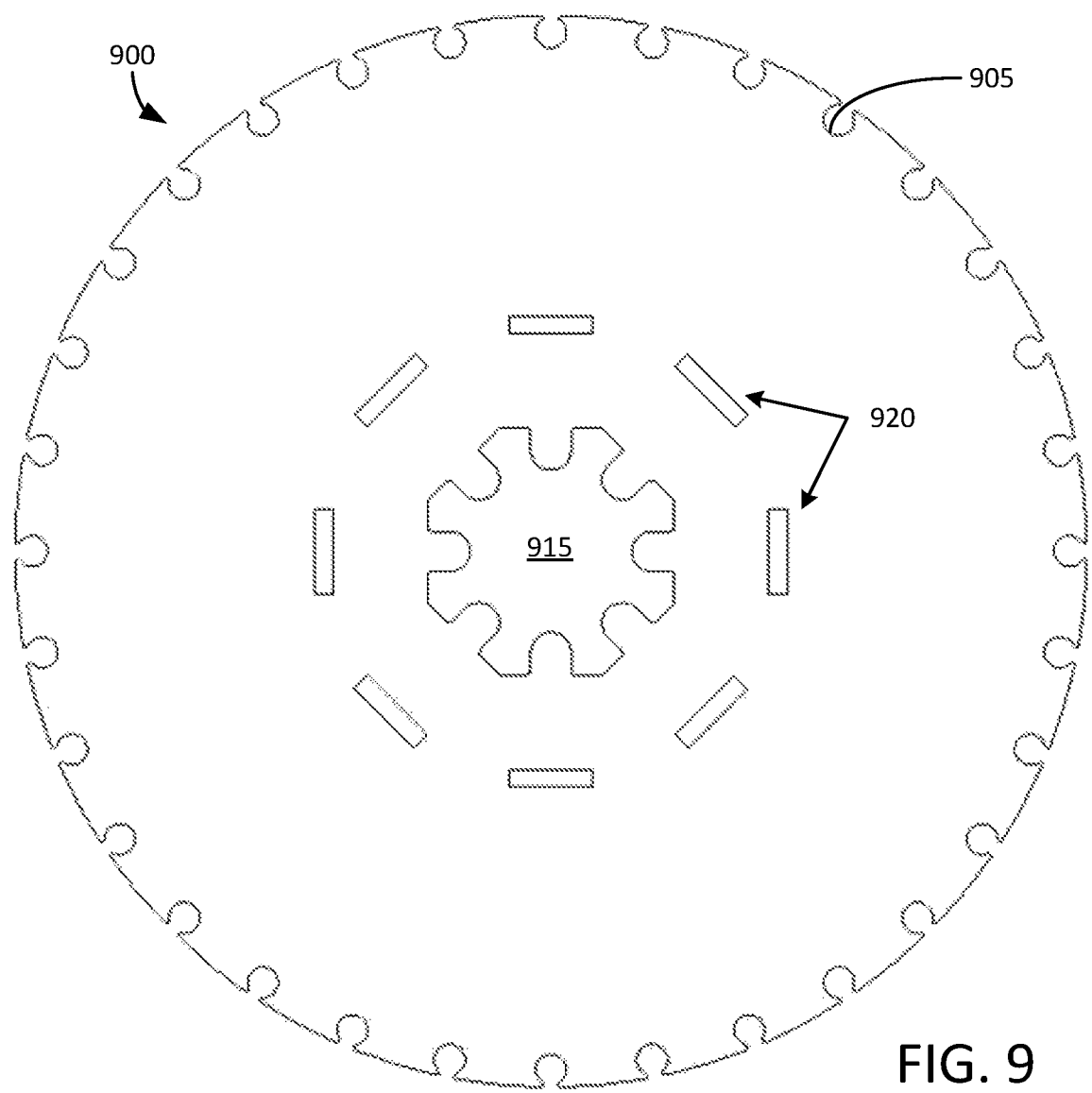
FIG. 9 illustrates a plan view of an example retrofit disc in accordance with various embodiments of the present inventive concept.
Figure 10:
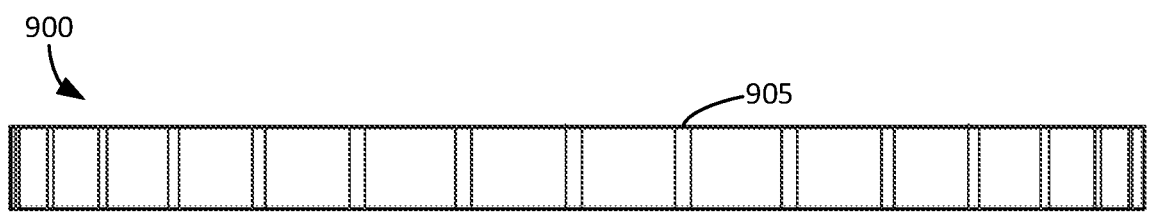
FIG. 10 illustrates a side elevation view of the retrofit disc of FIG. 9.
Figure 11:
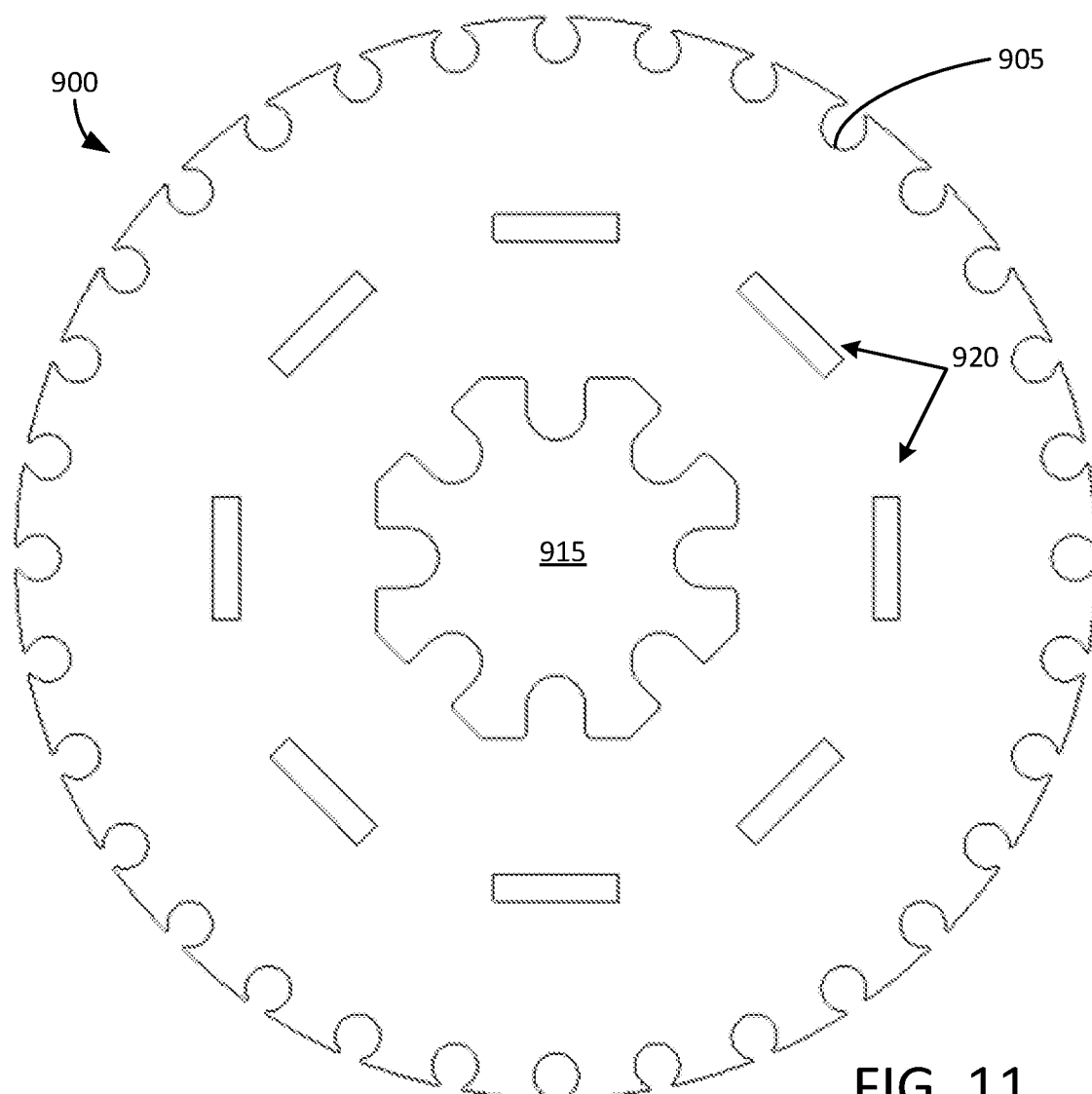
FIG. 11 illustrates a plan view of another example retrofit disc in accordance with various embodiments of the present inventive concept.
Figure 12:
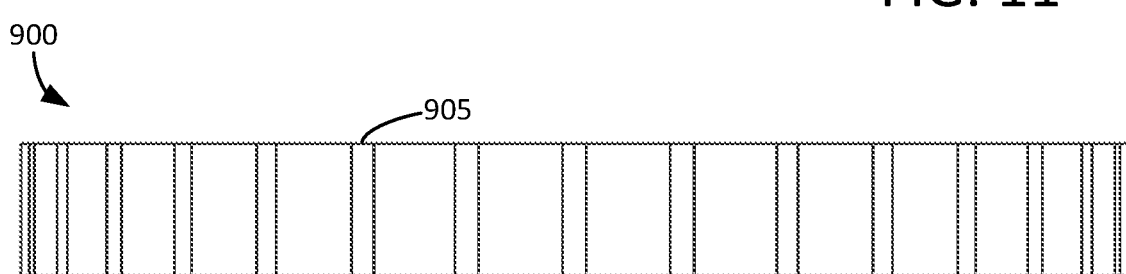
FIG. 12 illustrates a side elevation view of the retrofit disc of FIG. 11.

FIG. 9 illustrates a plan view of an example retrofit disc 900 in accordance with various embodiments of the present inventive concept. FIG. 10 illustrates a side elevation view of the retrofit disc 900 of FIG. 9. FIG. 11 illustrates a plan view of another example retrofit disc 900 in accordance with various embodiments of the present inventive concept. FIG. 12 illustrates a side elevation view of the retrofit disc 900 of FIG. 11. Reference is now made to FIGS. 9 through 12.

One or more retrofit discs 900 can be slid down or up the shaft 126 by aligning the shaft opening 915 with the shaft 126. Each retrofit disc 900 can include one or more slot openings 920 through which one or more corresponding stays can be inserted, as further described below. The retrofit disc 900 can include rotary notches 905 through which conventional vertical rods with vertical cloth brush panels can be inserted, as further described below. In some embodiments, the retrofit disc 900 can have a similar diameter as the fillers 705.

The retrofit disc 900 can be about ¼ inch thick, ½ inch thick, or one inch thick. In some embodiments, the retrofit disc 900 can range from six (6) inches to twenty (20) inches in diameter. For example, the retrofit disc 900 can have a diameter of about six (6) inches, eight (8) inches, ten (10) inches, twelve (12) inches, or sixteen (16) inches. It will be understood that the retrofit disc 900 can have other suitable dimensions. The retrofit disc 900 can be easily and freely slid off the shaft 126. This reduces the time for replacing cloth and eliminates the need to purchase a brush core or hub every few years.

Figure 13:
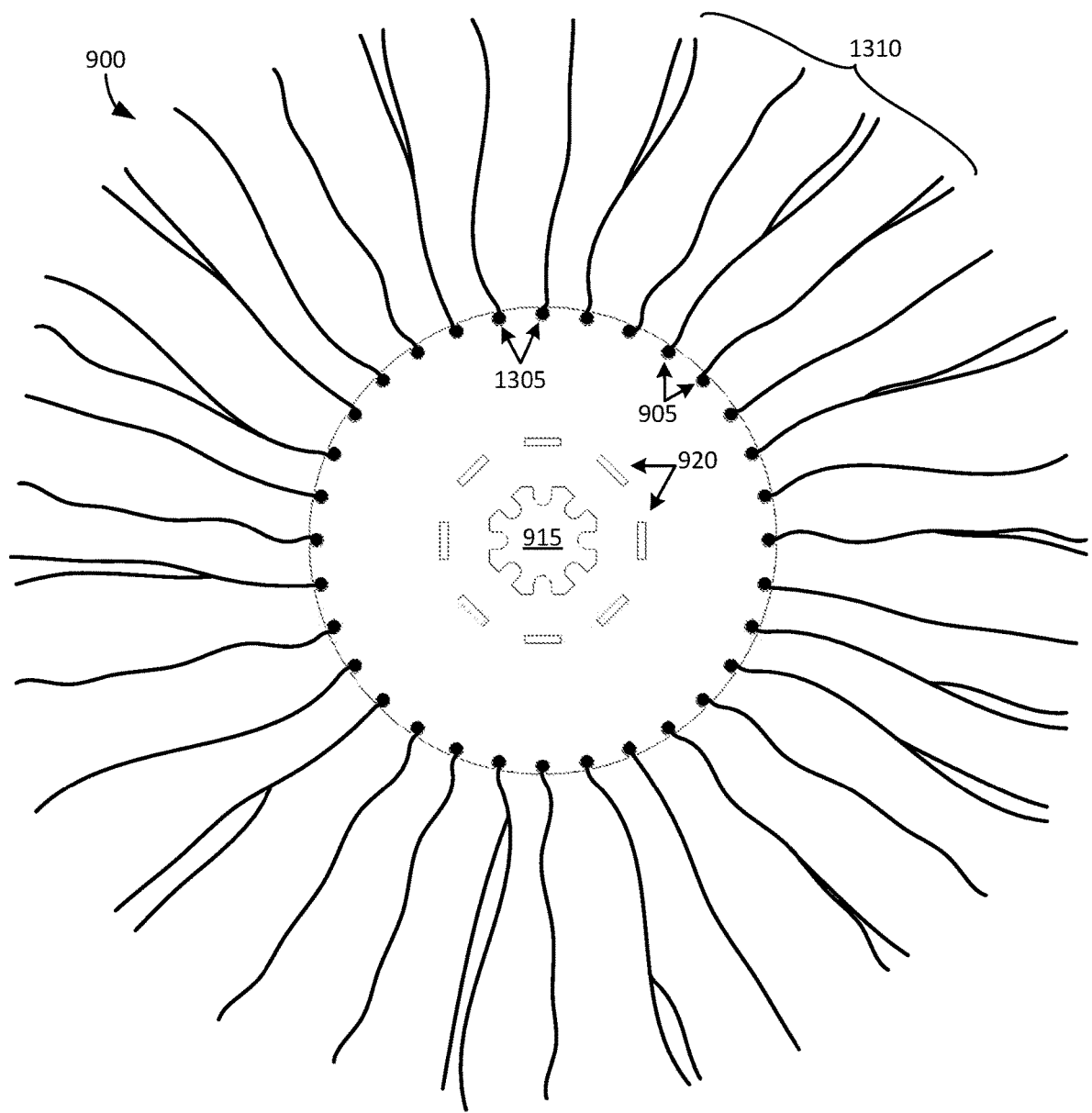
FIG. 13 illustrates a plan view of an example retrofit disc with conventional vertical rods with vertical cloth brush panels inserted in the rotary notches in accordance with various embodiments of the present inventive concept.

FIG. 13 illustrates a plan view of an example retrofit disc 900 with conventional vertical rods 1305 with vertical cloth brush panels 1310 inserted in the rotary notches 905 in accordance with various embodiments of the present inventive concept. In some embodiments, each of the vertical rods 1305 with vertical cloth brush panels 1310 can be inserted into a corresponding rotary notch 905 around the retrofit disc 900. In some embodiments, each of the vertical rods 1305 with vertical cloth brush panels 1310 can be removed from a corresponding rotary notch 905 around the retrofit disc 900. In some embodiments, the retrofit disc 900 and all of the vertical rods 1305 with vertical cloth brush panels 1310 can be removed in one motion from the shaft 126, or installed in one motion onto the shaft 126. In some embodiments, each vertical cloth brush panel includes multiple cloth flaps.

Figure 14:
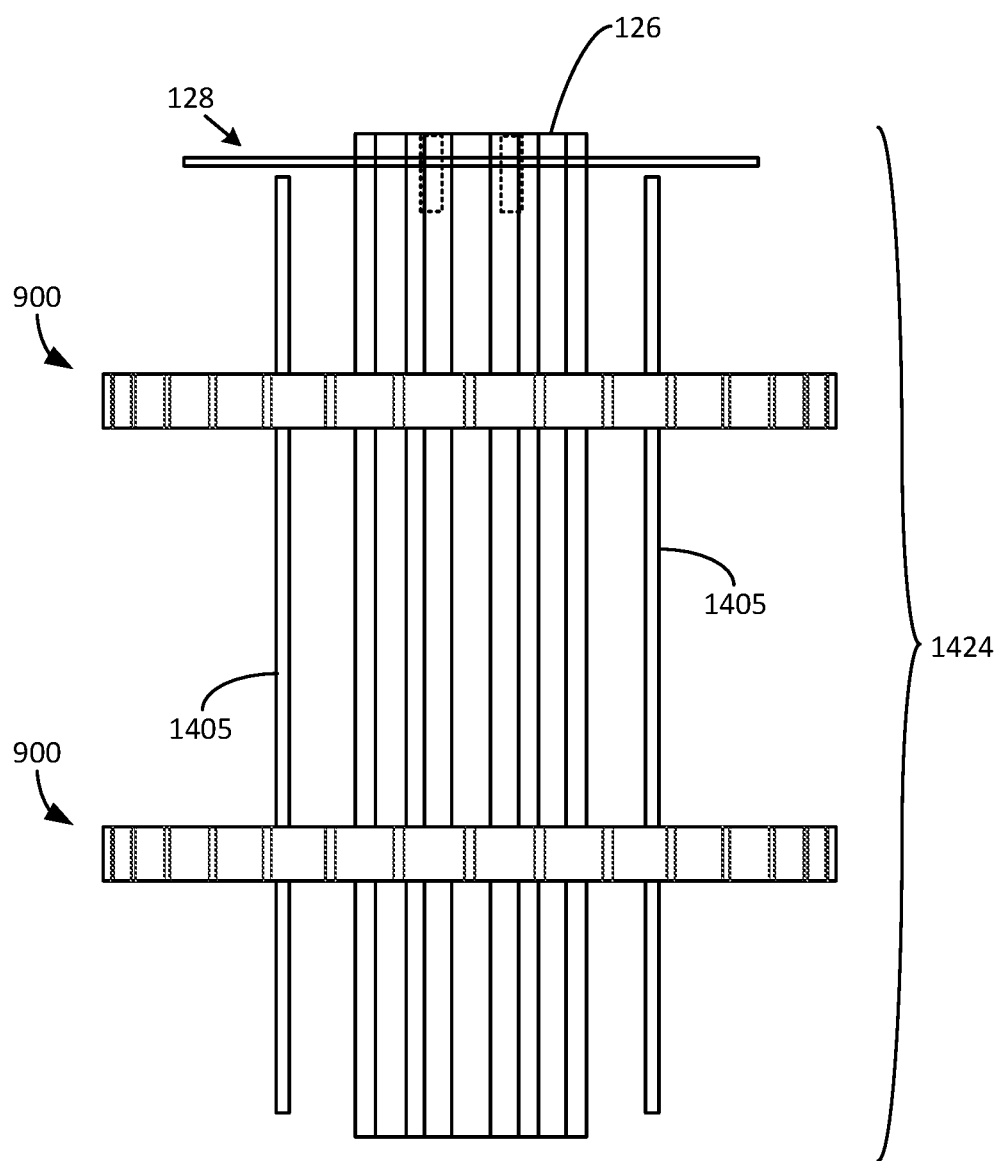
FIG. 14 illustrates a side elevation view of an example shaft assembly in accordance with various embodiments of the present inventive concept.

FIG. 14 illustrates a side elevation view of an example shaft assembly 1424 in accordance with various embodiments of the present inventive concept. The shaft assembly 1424 can include an upright shaft 126, a cap plate 128, and a plurality of retrofit discs 900. While two retrofit discs 900 are shown, it will be understood that any suitable number of retrofit discs 900 can be used with a single shaft 126. In addition, the shaft assembly 1424 can include a plurality of elongate stays 1405. In some embodiments, the elongate stays 1405 can have an elongated rectangular shape. In some embodiments, the elongate stays 1405 can have a length that is similar to that of the shaft 126. Each of the elongate stays 1405 can be a flat piece of steel that locks the retrofit discs 900 together and aids in their simultaneous rotation. While only two elongate stays 1405 are shown in FIG. 14, it will be understood that any suitable number of elongate stays 1405 can be used and inserted into corresponding slot openings 920 (of FIG. 13).

Figure 15:
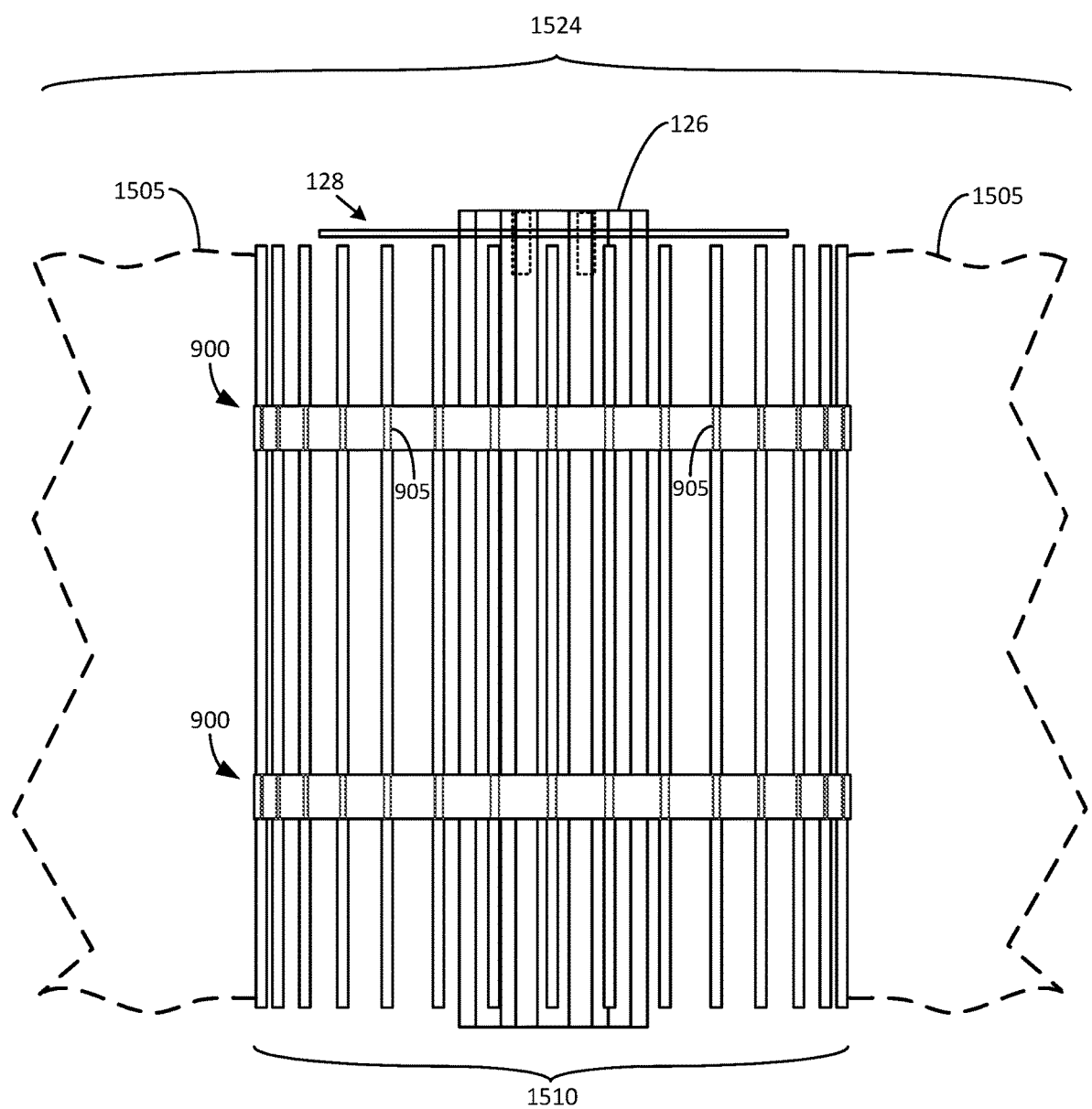
FIG. 15 illustrates a side elevation view of an example shaft and cloth assembly in accordance with various embodiments of the present inventive concept.

FIG. 15 illustrates a side elevation view of an example shaft and cloth assembly 1524 in accordance with various embodiments of the present inventive concept. The shaft and cloth assembly 1524 can include an upright shaft 126, a cap plate 128, and a plurality of retrofit discs 900. In addition, the shaft and cloth assembly 1524 can include a plurality of conventional vertical rods 1510 with vertical cloth brush panels 1505 attached to corresponding vertical rods 1510. While only vertical cloth brush panels 1505 are shown in FIG. 15, it will be understood that any suitable number of vertical cloth brush panels 1505 can be used and inserted along with corresponding vertical rods 1510 into corresponding rotary notches 905. In this manner, the shaft and cloth assembly 1524 can be easily retrofitted with conventional vertical rods and cloth panels. While not shown in FIG. 15, it will be understood that the shaft and cloth assembly 1524 can include the plurality of elongate stays 1405 (of FIG. 14).

Figure 16:
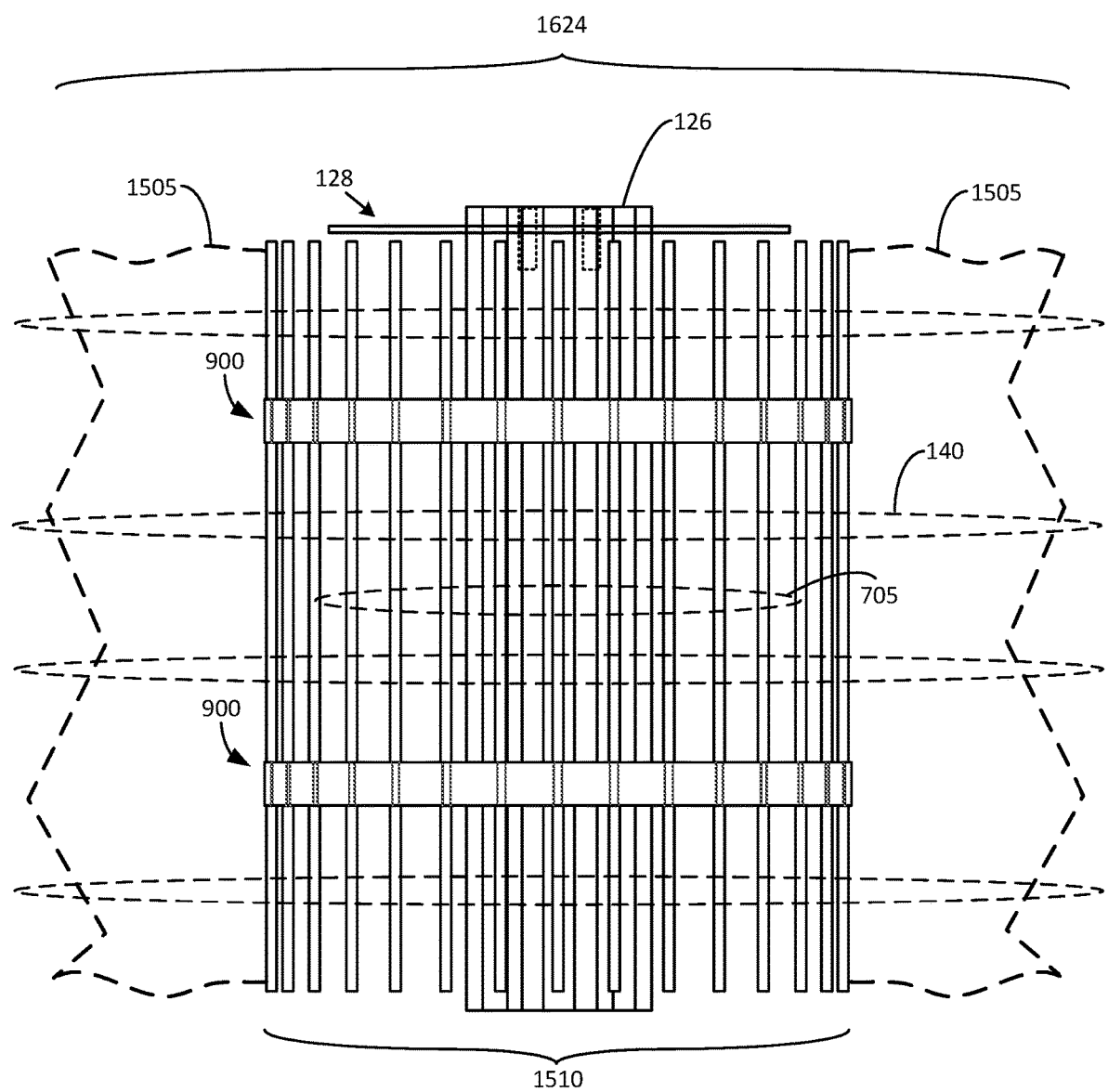
FIG. 16 illustrates a side elevation view of an example shaft and cloth assembly in accordance with various embodiments of the present inventive concept.

FIG. 16 illustrates a side elevation view of an example shaft and cloth assembly 1624 in accordance with various embodiments of the present inventive concept. The shaft and cloth assembly 1624 can include an upright shaft 126, a cap plate 128, and a plurality of retrofit discs 900. In addition, the shaft and cloth assembly 1624 can include a plurality of conventional vertical rods 1510 with vertical cloth brush panels 1505 attached to corresponding vertical rods 1510. While only vertical cloth brush panels 1505 are shown in FIG. 15, it will be understood that any suitable number of vertical cloth brush panels 1505 can be used and inserted along with corresponding vertical rods 1510 into corresponding rotary notches 905.

Moreover, the shaft and cloth assembly 1624 can include a hybrid cloth panel configuration in which one or more horizontal cloth brush panels 140 can be disposed on the shaft 126 along with the conventional vertical cloth brush panels 1505. In addition, one or more fillers 705 can be disposed on the shaft 126 in between the horizontal cloth brush panels 140. In this manner, the shaft and cloth assembly 1624 can be easily retrofitted with conventional vertical rods and cloth panels 1505, while also advantageously including the horizontal cloth brush panels 140 within the same shaft and cloth assembly 1624, to clean areas of the vehicle 105 that are otherwise inaccessible by the vertical cloth brush panels 1505 alone. While not shown in FIG. 16, it will be understood that the shaft assembly 1524 can also include the plurality of elongate stays 1405 (of FIG. 14).

The following discussion is intended to provide a brief, general description of a suitable machine or machines in which certain aspects of the inventive concept can be implemented. In some embodiments, a vehicle side washer assembly (e.g., 102/104) includes a retractable angled primary arm 120, a retractable secondary arm 130 coupled to the retractable angled primary arm 120, and a shaft assembly 124 coupled to the retractable secondary arm 130. The shaft assembly 124 can include an upright shaft 126. The vehicle side washer assembly 102 can further include a plurality of horizontal cloth brush panels 140. The upright shaft 126 can be disposed through a shaft attachment region 430 of each of the horizontal cloth brush panels 140.

In some embodiments, the vehicle side washer assembly includes a floor mount 115 coupled to the retractable angled primary arm 120, a primary shock and spring assembly 125 coupled to the floor mount 115 and to the retractable angled primary arm 120, and a secondary shock and spring assembly 135 coupled to the retractable angled primary arm 120 and to the retractable secondary arm 130. In some embodiments, the secondary shock and spring assembly 135 is disposed within the retractable angled primary arm 120. In some embodiments, the secondary shock and spring assembly 135 is disposed external to the retractable angled primary arm 120.

In some embodiments, the vehicle side washer assembly 102 includes a first pivot 117 connecting the retractable angled primary arm 120 to the floor mount 115, and a second pivot 198 connecting the retractable secondary arm 130 to the retractable angled primary arm 120. In some embodiments, the vehicle side washer assembly 102 includes an upper bracket 190 coupled to an upper side of a joint region of the retractable secondary arm 130 and the retractable angled primary arm 120, and at least partially covering an upper side of the second pivot 198. In some embodiments, the vehicle side washer assembly 102 includes a lower bracket 195 coupled to a lower side of the joint region of the retractable secondary arm 130 and the retractable angled primary arm 120, and at least partially covering a lower side of the second pivot 198.

In some embodiments, the retractable angled primary arm 120 includes a rounded oblique bend 122 away from a path of travel of the vehicle 105. In some embodiments, the retractable secondary arm 130 is substantially straight. In some embodiments, the retractable angled primary arm 120 is configured to retract out and away from the path of travel of the vehicle 105 as the vehicle 105 makes contact with the horizontal cloth brush panels 140. In some embodiments, the retractable secondary arm 130 is configured to retract out and away from the retractable angled primary arm 120, and further out and away from the path of travel of the vehicle 105 as the vehicle makes contact with the horizontal cloth brush panels 140.

In some embodiments, each of the horizontal cloth brush panels 140 includes a brush shaft opening 415 cut to match contours of the upright shaft 126. In some embodiments, each of the horizontal cloth brush panels 140 includes a plurality of flat fingers 405. In some embodiments, each of the horizontal cloth brush panels 140 and associated flat fingers 405 are substantially flat in a horizontal plane and configured to extend in the horizontal plane responsive to a rotation of the upright shaft 126. In some embodiments, the horizontal cloth brush panels 140 are configured to rotate in a reverse rotation with a direction of travel of the vehicle 150.

In some embodiments, the vehicle side washer assembly 102 can include one or more cloth panel fillers 705 disposed between at least some of the horizontal cloth brush panels 140. In some embodiments, the horizontal cloth brush panels 140 include a semicircular (½) cloth brush panel, a quarter circular (¼) cloth brush panel, and/or an eighth circular (⅛) cloth brush panel.

Some embodiments include a shaft assembly 124 of a vehicle side washer 102. The shaft assembly 124 can include an upright shaft 126 including a plurality of notches 805 and a plurality of protrusions 810. Some embodiments include one or more retrofit discs 900 each including a shaft opening 915 that matches contours of the notches 805 and the protrusions 810 of the upright shaft 126. In some embodiments, each of the retrofit discs 900 includes a plurality of rotary notches 905. In some embodiments, the rotary notches 905 are configured to receive vertical rods 1305 with vertical cloth brush panels 1310.

In some embodiments, each of the vertical cloth brush panels 1310 includes a plurality of flaps. In some embodiments, each of the vertical cloth brush panels 1310 and associated flaps are substantially flat in a vertical plane and configured to extend in the vertical plane responsive to a rotation of the upright shaft 126. In some embodiments, the shaft assembly 124 of the vehicle side washer 102 also includes a plurality of horizontal cloth brush panels 140. In some embodiments, the upright shaft 126 is disposed through a shaft attachment region 430 of each of the horizontal cloth brush panels 140.

In some embodiments, each of the horizontal cloth brush panels 140 includes a brush shaft opening 415 cut to match contours of the upright shaft 126. In some embodiments, each of the horizontal cloth brush panels 140 includes a plurality of flat fingers 405. In some embodiments, each of the horizontal cloth brush panels 140 and associated flat fingers 405 are substantially flat in a horizontal plane and configured to extend in the horizontal plane responsive to a rotation of the upright shaft 126. In some embodiments, the horizontal cloth brush panels 140 are configured to rotate in a reverse rotation with a direction of travel of the vehicle 105.

In some embodiments, the shaft assembly 124 of the vehicle side washer 102 includes one or more cloth panel fillers 705 disposed between at least some of the horizontal cloth brush panels 140. In some embodiments, the shaft assembly 124 of the vehicle side washer 102 includes one or more elongate stays 1405. In some embodiments, the one or more retrofit discs 900 include a plurality of retrofit discs 900. In some embodiments, each of the retrofit discs 900 includes one or more slot openings 920. In some embodiments, the one or more slot openings 920 are configured to receive the corresponding one or more elongate stays 1405 to lock the retrofit discs 900 together in a simultaneous rotation.

Some embodiments include a horizontal cloth brush panel 140 for use with a vehicle side washer 102. In some embodiments, the horizontal cloth brush panel 140 includes a plurality of flat fingers 405, a contiguous central region 410 adjacent to and coupled with the plurality of flat fingers 405, and a brush shaft opening 415 adjacent to the contiguous central region 410, and cut to match contours of an upright shaft 126 of the vehicle side washer 102.

In some embodiments, the horizontal cloth brush panel 140 for use with the vehicle side washer 102 includes one or more slot openings 420 configured to receive one or more corresponding elongate stays 1405. In some embodiments, the horizontal cloth brush panel 140 includes a partial circular portion 425 that partially encircles at least half of the brush shaft opening 415 and at least some of the slot openings 420. In some embodiments, the horizontal cloth brush panel 140 includes at least one of a semicircular (½) cloth brush panel, a quarter circular (¼) cloth brush panel, or an eighth circular (⅛) cloth brush panel.

Having described and illustrated the principles of the inventive concept with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A horizontal cloth brush panel for use with a vehicle side washer, the horizontal cloth brush panel comprising:
   a plurality of flat fingers;
   a contiguous central region adjacent to and coupled with the plurality of flat fingers; and
   a brush shaft opening adjacent to the contiguous central region; and
   one or more slot openings configured to receive one or more corresponding elongate stays.

2. The horizontal cloth brush panel for use with a vehicle side washer of claim 1, further comprising a partial circular portion that partially encircles at least half of the brush shaft opening and at least some of the slot openings.

3. The horizontal cloth brush panel for use with a vehicle side washer of claim 1, wherein the brush shaft opening is cut to match one or more predefined contours including a plurality of protrusions and a plurality of notches.

4. The horizontal cloth brush panel for use with a vehicle side washer of claim 3, wherein the plurality of notches are U-shaped.

5. The horizontal cloth brush panel for use with a vehicle side washer of claim 3, wherein the brush shaft opening is octagonal.

6. The horizontal cloth brush panel for use with a vehicle side washer of claim 3, wherein each of the plurality of protrusions includes an angled head drawn to an outwardly facing point.

7. The horizontal cloth brush panel for use with a vehicle side washer of claim 1, further comprising one or more cloth panel fillers.

8. The horizontal cloth brush panel for use with a vehicle side washer of claim 7, wherein the one or more cloth panel fillers each have a diameter that is smaller than a diameter of the horizontal cloth brush panel.

9. The horizontal cloth brush panel for use with a vehicle side washer of claim 7, wherein the one or more cloth panel fillers are each between ¼ inch thick and 1 inch thick.

10. The horizontal cloth brush panel for use with a vehicle side washer of claim 7, wherein the one or more cloth panel fillers each have a diameter of between 6 inches and 20 inches.

11. The horizontal cloth brush panel for use with a vehicle side washer of claim 1, wherein the brush shaft opening is 3 inches in diameter.

12. The horizontal cloth brush panel for use with a vehicle side washer of claim 1, wherein the brush shaft opening is configured to be filled by an upright shaft of the vehicle side washer.

13. The horizontal cloth brush panel for use with a vehicle side washer of claim 1, wherein the plurality of flat fingers are configured to wash the vehicle while being rotated in a direction that is against a direction of travel of the vehicle.

14. A horizontal cloth brush panel for use with a vehicle side washer, the horizontal cloth brush panel comprising:
   a plurality of flat fingers;
   a contiguous central region adjacent to and coupled with the plurality of flat fingers; and
   a brush shaft opening adjacent to the contiguous central region,
   wherein the horizontal cloth brush panel includes at least one of a semicircular (½) cloth brush panel, a quarter circular (¼) cloth brush panel, or an eighth circular (⅛) cloth brush panel.

15. A horizontal cloth brush panel for use with a vehicle side washer, the horizontal cloth brush panel comprising:
   a plurality of flat fingers;
   a contiguous central region adjacent to and coupled with the plurality of flat fingers;
   a brush shaft opening adjacent to the contiguous central region;
   one or more cloth panel fillers; and
   one or more slot openings configured to receive one or more corresponding elongate stays, wherein the one or more corresponding elongate stays pass through the slot openings of the cloth brush panel and through the one or more cloth panel fillers to lock the cloth brush panel and the one or more cloth panel fillers together.

\* \* \* \* \*